(12) United States Patent
Apanovitch et al.

(10) Patent No.: US 11,449,646 B2
(45) Date of Patent: *Sep. 20, 2022

(54) SECTIONLESS ADDENDUM DESIGN

(71) Applicant: Hexagon Manufacturing Intelligence Canada Limited, Toronto (CA)

(72) Inventors: Victor Apanovitch, Mississauga (CA); Stefan Martin Walter Huhn, Burlington (CA); Yongguo Wu, Burlington (CA); Derek Edward George Peeling, Burlington (CA); Dong Zhao, Burlington (CA)

(73) Assignee: HEXAGON MANUFACTURING INTELLIGENCE CANADA LIMITED, Toronto (CA)

( * ) Notice: Subject to any disclaimer, the term of this patent is extended or adjusted under 35 U.S.C. 154(b) by 117 days.

This patent is subject to a terminal disclaimer.

(21) Appl. No.: 16/671,311

(22) Filed: Nov. 1, 2019

(65) Prior Publication Data

US 2020/0065431 A1    Feb. 27, 2020

Related U.S. Application Data

(63) Continuation of application No. 14/527,285, filed on Oct. 29, 2014, now Pat. No. 10,515,157.
(Continued)

(51) Int. Cl.
*G06F 30/00* (2020.01)
*B23P 15/24* (2006.01)
(Continued)

(52) U.S. Cl.
CPC ............. *G06F 30/00* (2020.01); *B21D 22/20* (2013.01); *B23P 15/24* (2013.01);
(Continued)

(58) Field of Classification Search
CPC .......... G06F 30/00; G06F 30/15; G06F 30/17; G06F 2113/24; B23P 15/24; B21D 22/20;
(Continued)

(56) References Cited

U.S. PATENT DOCUMENTS 5,119,309 A * 6/1992 Cavendish ............. G05B 19/41
                                                    700/182
7,464,011 B2  12/2008 Ren et al.
(Continued)

FOREIGN PATENT DOCUMENTS

GB         2295701 A       6/1996
WO       2015061884        5/2015

OTHER PUBLICATIONS

Debray, K., Li, Y.M. & Guo, Y.Q. Int J Mater Form (2013) 6: 315. doi: 10.1007/s12289-011-1088-x International Journal of Material Forming Sep. 2013, vol. 6, Issue 3, pp. 315-325 "Parametric design and optimization of addendum surfaces for sheet metal forming process".
(Continued)

*Primary Examiner* — Steven W Crabb
(74) *Attorney, Agent, or Firm* — Mark L. Maki; Miller Canfield

(57) ABSTRACT

A method is provided for the creation of an addendum for use in the design and production of sheet metal formed components, which method uses a sectionless approach. In a preferred approach, elevation curve (EC) lines are established relating to the component (ECc) and binder (ECb), and it is these lines which are used to design the addendum. Additional EC lines (EC1, EC2, EC3, etc.) can be added to modify or optimize the addendum design. The spaces between the EC lines are filled using various parameterized filling techniques so as to provide the addendum design. Optimization of the addendum can be achieved by modification of the various EC lines, so as to modify or control the
(Continued)

various design parameters, in accordance with various quality or design criteria. A more rapid, and less complicated approach to addendum design is provided.

19 Claims, 25 Drawing Sheets

Related U.S. Application Data

(60) Provisional application No. 61/896,784, filed on Oct. 29, 2013.

(51) Int. Cl.

| | | |
|---|---|---|
| *B21D 22/20* | (2006.01) | |
| *G06F 30/15* | (2020.01) | |
| *G06F 30/17* | (2020.01) | |
| *G05B 19/4093* | (2006.01) | |
| *G06F 113/24* | (2020.01) | |

(52) U.S. Cl.
CPC ......... *G05B 19/4093* (2013.01); *G06F 30/15* (2020.01); *G06F 30/17* (2020.01); *G05B 2219/35044* (2013.01); *G06F 2113/24* (2020.01); *Y02P 80/40* (2015.11)

(58) Field of Classification Search
CPC ...... G05B 19/4093; G05B 2219/35044; Y02P 80/40
See application file for complete search history.

(56) References Cited

U.S. PATENT DOCUMENTS

| | | |
|---|---|---|
| 7,542,889 B2 | 6/2009 | Hillmann et al. |
| 7,623,939 B2 | 11/2009 | Hillmann et al. |
| 7,894,929 B2 | 2/2011 | Hillmann et al. |
| 2010/0278375 A1 | 11/2010 | Abell et al. |
| 2012/0123741 A1* | 5/2012 | Kubli ............... G06F 30/00 703/1 |
| 2013/0041635 A1 | 2/2013 | Zhu |

OTHER PUBLICATIONS

Journal of Manufacturing Science and Engineering article, titled, Integration of CAD and FEA for Concurrent Engineering Design of Sheet Stamping, Aug. 1996.
Joint paper presented at the Confederation of British Metalforming Technical Conference 2001, by Dr. Brian Miller and Richard Bond.
The International Search Report and Written Opinion of the International Searching Authority for PCT/CA2014/000774, date completed Jan. 7, 2015, dated Jan. 12, 2015.
PCT International Preliminary Report on Patentability PCT/CA2014/000774 dated May 3, 2016.
European Search Report for EP Application No. 14858284.4, dated Jun. 14, 2017.

* cited by examiner

SECTIONLESS ADDENDUM DESIGN

CROSS REFERENCE TO RELATED APPLICATIONS

This application is a continuation of U.S. application Ser. No. 14/527,285, filed Oct. 29, 2014, claiming priority from provisional application 61/896,784, filed on Oct. 29, 2013, the disclosure of which applications are incorporated herein by reference.

FIELD OF THE INVENTION

The present invention relates to the field of designing an addendum, and in particular, to the design and optimization of the addendum used in the manufacture of formed sheet metal parts, such as those parts produced by, for example, drawing, deep-drawing, stamping, stretch-forming operations, or by any similar processes.

BACKGROUND OF THE INVENTION

Sheet metal formed parts, such as fender or hood panels in automotive applications, or a variety of other parts, are typically manufactured by way of drawing, stamping, deep-drawing, stretch-forming, or the like. The parts are typically manufactured from a flat sheet metal blank in several operations (including cutting, drawing, reshaping, trimming, flanging, etc.), within a forming press. To facilitate various aspects of the process, additional material is included together with the component design in order to control the material flow into the die cavity. This is done so that the component can be produced defect-free (no splitting, wrinkling, excessive thinning, etc.).

This additional material is termed the "addendum", and is the material outside of the final part, and which connects the part, or component geometry, with a binder. The addendum geometry is of significant importance to a defect-free drawing process, since it is the main forming control mechanism to achieve quality products. The addendum provides continuity between the binder and the component.

For components with large cut-outs, such as body sides of passenger cars, internal addenda can also be created, in order to satisfy similar continuity requirements to the component, and an internal binder.

Optimization of the addendum design can result in improved control of the component thickness, strength, strain, stress, shape, and the like, and thus, the quality of the component can be controlled using these quality criteria. As such, with regard to design optimization, it is the addendum design which requires specific attention during the tooling geometry design.

The sheet metal tooling for the drawing operation typically consists of three parts: a die (female part of tooling), an optional binder or blank holder (to position and hold the sheet metal blank and/or to control material flow into the die cavity), and a punch (male part of the tooling that drives a typically metal (e.g. steel or aluminum) blank into the die cavity during the forming process).

The drawing process typically involves preparing a suitably shaped die punch which is pressed into a surface of the blank in order to create a component having the desired shape and appearance. The addendum is designed to ensure the desired shape and quality of the component part, is achieved from the blank.

It should be noted that the desired component shape formed from the blank has been pre-established. As a result, the component design does not typically change during the design of the addendum, and as such, the shape and design of the component per se, is generally outside of the scope of the present invention.

The blank can be flat, but more typically, is curved to generally follow the lines of the desired part. Moreover, it can also be shaped so as to facilitate the forming operation. Consequently, the blank is commonly pre-formed (usually curved) and fixed within the die. In fact, the blank may be pre-formed in an earlier operation of the sheet metal operation.

The blank is typically held at the edge of the blank in the binder, so as to avoid unwanted movement of the blank during the forming operation. As such, a binder is typically formed on the blank, and the blank usually conforms to the binder shape. In most operations, the surface(s) of the binder are normally continuous surfaces.

In the prior art, the component and binder shapes have been pre-established, and once established, the complex task of addendum design was initiated. This typically required the use of a sectional design approach, in which numerous vertical, planar section lines were used to connect the part edge, and the binder, so as to create a sectional profile for that part of the addendum. Once one section was designed, the operator would design an adjacent section, and the procedure would be repeated around the part. Afterwards, the vertical sectional lines would be inter-related, one to the other, so as to prepare a suitable addendum design geometry.

However, while this process would eventually provide a suitable addendum shape, the process was labour intensive. Furthermore, if the component design was modified, or its position, or orientation, or some other parameter was modified, the procedure of section line design would need to be re-initiated, so as to prepare a new addendum design.

Even with the advent of computerized systems, the design of the addendum geometry still required excessive time and labour. These initial systems again followed the traditional approach to design the addendum by using section lines originating from a point on the component edge and extending outward, and ending at a point on the binder. The section lines however, were usually normal to the component edge and projected in the direction of the drawing process. When these lines were inter-related, it was not uncommon to obtain twisted and/or badly interpolated addendum.

More recently, the computerized sectional approach has been improved as described in, for example, U.S. Pat. Nos. 7,623,939, 7,894,929 and 8,155,777, and in US patent publication No. 2012/0197602. The approaches described in these patents improved the computerized design approach by using non-planar section lines, and by allowing for transverse interpolation of the non-planar section lines. This approach was further improved by smoothing the component edge, by filling the surface areas at edge discontinuities, or modified via a rolling cylinder technique. This resulted in a well behaved and smooth outside component edge before the section lines are attached, and therefore substantially overcame the problem of having irregular and highly twisted addendum.

These approaches therefore provided at least some form of addendum design automation, and hence made it possible to use an optimization design procedure. These approaches also provided a solution to overcome the overlap of section lines around the concave component boundaries, by the use of non-planar section lines.

While these approaches have reduced the time and effort required for addendum design, all of these approaches are still based on a sectional approach in which section lines originating from the component edge and extending outward to the binder, are used. As such, even with the use of a computerized technique, addendum design is still somewhat cumbersome. Consequently, design and modification of the overall die design is still a skill and labour intensive process.

As such, while the art of addendum design has improved significantly over the last few years, proper addendum design continues to be a challenge, since addendum design, even when performed virtually using computer aided design (CAD) systems, still requires considerable effort.

For example, as a rule of thumb the number of addendum surfaces in CAD, is usually of the same order as the surfaces making up the component geometry. As such, for large body parts, the number of addendum surfaces can be considerable, and the design of the addendum still requires the involvement of a forming and CAD design specialist.

Other issues with the prior art approaches are known, as such, included in the problems associated with current computerized addendum design approaches, are the following issues:

i) the section lines require detailed definitions, and hence considerable efforts are expended in areas where such accuracy is not warranted;

ii) with the section line definitions, the draw depth, the connection to binder, the Punch and Die Opening Lines, among other thing, are extracted, as opposed to being inputted into the design definition. Accordingly any modifications to these parameters would necessitate re-definition of many sections. This limits the type of optimization that can be performed;

iii) the section based procedure adapts reasonably well to the case where the component geometry is on the punch face, but typically does not address the general cases where the component geometry covers other areas of the tooling, e.g. punch sides and binder;

iv) the procedure is still complex and requires considerable expertise, and hence does not lend itself to quick applications for sketching and cost engineering;

v) the technology typically requires too many inputs, and requires simplification in order for the system to be used by the non-specialist;

vi) the location, direction and number of section lines required around the component boundaries are not necessarily obvious to the non-specialists. For example, it is unclear to the unskilled user whether the section line directions are to be perpendicular to component edge, along principal geometry direction or along metal flow directions. It is also not clear to the non-specialist how the resulting addendum solution is dependent on, or affected by, such assumptions;

vii) the section line technology does not lend itself to the minimization and optimization of the punch face, before the finalized generation of the addendum, and hence to facilitating blank size reduction. Furthermore, the punch face is not readily defined but needs to be extracted from all the sectional profiles; and viii) flange and hem features typically have to be removed prior to addendum design.

To overcome these difficulties, it would be advantageous to provide a method for addendum design, wherein the addendum can be designed and optimized in a more rapid, and less complex fashion. Further, it would also be advantageous to provide a method wherein design and optimization of the addendum was achieved with minor use of, or preferably, without the use of the section line approach. Still further, it would be advantageous to produce a method wherein the design of the addendum is more easily modified.

Even further, it would be advantageous to provide a method for the design and modification of the addendum geometry which could be more easily related and modified based on simulated and/or calculated design parameters, and/or more easily modified based on parameter modification.

These and other advantages are provided by the methods and apparatuses of the present invention, as hereinafter described.

SUMMARY OF THE INVENTION

It is therefore an advantage of the present invention to provide a method for the design of an addendum, using a simplified, or alternative, approach to the determination of the addendum design, which method preferably completely eliminates, or at least minimizes, the need for a sectional design process. The method is particularly well suited for use in computer-aided design systems (CAD-systems), and particularly in those systems where the method can provide at least some, and preferably all, of the advantages previously mentioned.

The present invention therefore provides an efficient method to design the addendum. The resultant method involves fewer and simpler user skills while avoiding the prior art disadvantages resulting from the prior art sectional approach of using flat or curved section lines that extended outwardly from the edge of the component towards the binder. In particular, the method of the present invention allows for significant reduction of engineering and design efforts, and provides a method for the rapid creation, modification, and optimization of the addendum. As such, it is particularly well suited for optimization environments which can include simulated forming operations.

Thus, the advantages set out hereinabove, as well as other objects and goals inherent thereto, are at least partially or fully provided by: i) an improved addendum design method; ii) an improved method for the design and production of a die tool; iii) an improved method for the preparation of a resultant die or tool prepared using this addendum design approach; iv) an improved method to establish a parameterized model for preparing a forming simulation, based on a predefined component design geometry; and iv) the development of a computerized system for implementation of the design, provide improved optimization and modification technology of a die and die tool design method, as described herein.

A corresponding data processing system, a computer program and a data carrier can also be provided, for use in the practice of the present invention. Further, in the practice of the present invention, a computer program can be provided which can be operated and/or utilized; preferably by using non-transitory computer readable mediums.

Once the addendum has been designed using the approach of the present invention, all or parts of the drawing process can be simulated in a simulation model, so as to optimize various parameters. These parameters include, for example, the required specifications of the sheet material used for the blank, including its thickness and its rolling direction; blank size and shape and the outline design thereof; specification of lubrication condition; definition of the retaining devices, e.g. drawbead, spacer, and binder force; as well as the determination of the tool movement. Any or all of these model parameters can be fine-tuned iteratively in the simulation in order to produce products of acceptable quality.

Accordingly, in a first aspect, the present invention provides a method for the design of an addendum, wherein all or part of the addendum is preferably designed in a sectionless approach, comprising: inputting a component design; establishing a plurality of at least two elevation curve (EC) lines to establish at least a first EC line and a distal EC line, wherein said first EC line is related to, or fully or partially established on said component design, and said distal EC line is fully or partially separated from said first EC line so as to establish a space between said first and said distal EC lines; and filling the space between said first and distal EC lines so as define said addendum.

The first EC line is typically located at least partially on an edge line of the component, but can also be established as a line having a design inherited from the component design. As such, the first EC line is related to the component design, or is fully or partially located on the component edge line. It should be noted that the phrase "related to" infers that the component edge line is to be used in determination of the first EC line. For example, the EC line may be established so as to be parallel to the component edge line. Additionally, the phrase "fully or partially established on said component design" infers that the EC line overlaps, to some extent, with the component design. However, it should also be noted that this includes more than just meeting the component edge line at a point, but requires, in this case, that the EC line extends along the component edge line for more than a single point.

In the case of partial addendum design, or a form die (i.e. without a binder) process, the distal EC line is established in 3D space. In the case of a draw die process (i.e. with a binder), the distal EC line is established on the binder, and the binder design is inputted into the system.

Additional EC lines can also be provided between the first and the distal EC lines to provide additional control of the addendum geometry. With the addition of additional EC lines, additional spaces between any and all adjacent EC lines are created. These spaces are also filled, in accordance with the present invention.

In a common embodiment, the first EC line is fully or at least partially established on the component and is designated as "ECc", and the distal, or in the case of 3 or more EC lines, the last or outside EC line is fully or at least partially established on the binder and is designated as "ECb". For most applications, the first EC line, namely ECc, is fully or partially on the component, and the distal or outside EC line, namely ECb, is fully or partially on the binder. Accordingly, in a simple approach, the outline of the component itself defines the first EC line, as ECc, and a further line, outside of ECc when viewed in plan view (which is usually perpendicular to the drawing direction), defines the distal EC line on the binder, as ECb.

As the complexity of the part and/or addendum increases, additional EC lines designated as EC1, EC2, EC3 etc., are established between ECc and ECb. The various EC lines are typically at least partially spaced apart from each other, and/or spaced apart from ECc and ECb. Contact of the EC lines is not precluded, however, and the EC lines can touch, or overlap in 3D space, under certain conditions. The total number of EC lines is typically between 2 and 10, but most preferably, is between 2 and 5.

Once the EC lines have been defined or established, interconnection of the spaces between at least two adjacent elevation curves is preferably accomplished using a parameterized filling technique; including using a parameterized filling technique which is surface based or is mesh based. The spaces may be interconnected with surfaces or meshes, wherein the addendum design is controlled by establishing surface or mesh continuity conditions at any or all of the elevation curve lines. Other filling techniques such as wire frame, or point cloud representations are however, not excluded.

In this document "adjacent" lines are those lines located next to one another, either in plan view or in 3D space. Normally, the adjacent lines are selected so as to avoid overlapping areas in plan view. The phrase "plan view" is to be interpreted as being generally perpendicular with respect to the drawing direction for the drawing operation.

In the preferred practice of the invention, the various EC lines are all 3D spatial curves. These are normally initially created at the pre-established component boundary (ECc), or on the binder (ECb), but these EC curves or additional EC curves (including EC1, EC2, EC3 etc.) can be established on the proposed addendum design, or on other construction surfaces. When viewed in a plan view for an exterior, or outside-of-the-part addendum, ECc is located inside of all other EC lines, with ECb typically being the outermost EC line. While this arrangement can be most clearly seen in plan view, it will be readily apparent that other views can and will be preferably used to in order to edit or amend the various EC curves in a 3D spatial environment.

Use of the technique of the present invention is also possible on internal, or inside-of-the-part, addendum, with the distal EC line being the line furthest from the component.

The construction surfaces can include any lines or surfaces, or other devices, which can be used to construct the geometrical objects. The EC lines are the main construction elements of the method of the present invention. The EC lines can be closed or open curves, and under some circumstance, can meet or contact one another. In the 3D spatial environment, the addendum may or may not pass through the EC lines, although most typically, they will, in fact, pass through most if not all of the various EC lines.

In the discussion which follows, it will be noted that in contrast to the section lines of the prior art which connect the component to the binder, the EC lines typically follow the shape of the component and/or binder. As such, while the prior art section lines are commonly all essentially in a plane in the drawing direction (e.g. a line in plan view), elevation curves can be in any direction, and are not limited to only the drawing direction.

Interconnection of the spaces between the various EC lines, with, for example, surfaces or meshes between the various EC lines, is preferably done so as to provide those addendum continuity conditions which have been assigned to the addendum, at the EC lines. Depending on the design, these values could be set to approach C0, C1 or C2 continuity conditions.

These continuity values are commonly defined as follows:
C0: just touching;
C1: tangent, but could have sudden change in curvature; and
C2: the surface or mesh features are curvature continuous to one another.

Other criteria including G0, G1, G2, G3, and G4 continuity conditions, or the like, might also be utilized.

A minimum of two EC lines are required to build the addendum. In a "simple" design (see Case 1 below), the ECc is the edge of the component, and ECb is established on the binder. For more complex parts, the number of EC lines is not limited, and it will be easily appreciated that the use of additional EC lines provides more control of the addendum design. In a more typical arrangement, at least one additional EC line (e.g. EC1) is used in order to better define the geometry of the addendum, and to provide improved optimization of the addendum design (see Case 2 below).

Additional EC lines (EC2, EC3 etc.) can be added as required to provide further control of the addendum design, and/or provide for special design conditions, such as, for example, use of a "sausage" feature (see Case 3 below).

Furthermore, it should be noted that specialized design considerations can be established. For example, in some embodiments, one or more EC lines can lie on the component itself, or on the component boundaries (see Case 4 below).

These various EC line arrangements for each case, will be described in more detail, hereinafter. Furthermore, once the EC lines have been established, various different approaches can be used to fill the spaces between the EC lines, as will also will be described in more detail, hereinafter. However, filling of the spaces between EC lines is easily achieved using various space filling techniques.

It should be noted that the process of the present invention provides significant flexibility in the design of the addendum for a variety of drawing operations. As such, it provides increased design flexibility over the prior art sectional line approach.

Moreover, the approach of the present invention is particularly well suited for computer assisted design operations, and while it is of particular use in addendum design, it is also well suited for use in related operations such as drawing simulation, cost estimating, and the like.

It will also be clear to the skilled artisan that the present invention is of most utility when the addendum design is accomplished within a computerized environment. By use of the phrase "computerized environment" it will be understood that the requisite computational tasks will be conducted by one or more central processing unit (CPU) or processor(s) located within a computerized device, and that suitable computerized devices can include any number of computerized devices such as mainframe computers, desktop computers, laptops, notebooks, PDAs, and the like. The user can interact with the computerized environment in any standard technique, including through stand alone computers, through terminal devices connected to a computerized system, or through remote connections such as connections within a network (including a local network, or a larger network, such as the Internet).

The software related to the present approach, as well as the part and binder designs, can be stored on any suitable storage devices, which can be positioned locally (such as a computer hard drive), or remotely such as in a network server, or the like. The software, or a part thereof, might be also located within the computerized device as part of the firmware of the computerized system.

The software is preferably related to, or part of a CAD system, which can incorporate parts designed within the CAD system, and use the part designs established in the CAD environment, to form the component designs used in the practice of the present invention.

In particular, it should also be noted that the approach of the present invention is particularly well suited for simulations of the drawing operation. When used in this fashion, preferably every parametric change that modifies the addendum and tools design (such as draw depth/travel paths, outside part edge, minimum POL and corresponding DOL, etc.) results in an automatic redefinition of the tool surfaces, of the blank outline, etc. so that the simulation can be preferably automatically updated within the computerized environment, without any manual intervention. As compared to the prior art, the effort for the preparation of alternative simulations, whether manually, semi-automatically, or by being carried out automatically (preferably within an optimization loop), can be significantly reduced. Consequently, when changing the parameters of the addendum design, essentially immediate and fully automatic modification and design of the tool geometry, and a corresponding and consistent geometry and process model for the simulation, can be created.

If desired, the geometrical information and data related to the tool (die, optional binder, punch) and the sheet metal part, handled and generated by the herein described invention, can be used as input data for tooling. In this way it is possible to avoid additional processing by a CAD-System, which results in a further optimized process.

The present invention is also adapted to produce a tool for use in the production of designed components, wherein the tool design is taken from the addendum design process. As such, in a further aspect, the present invention also provides a method for designing a tool, which typically involves drawing of sheet metal, in order to form a sheet metal component having a predefined component geometry, said tool comprising a die, an optional binder and a punch, whereby the optional binder is used to position and/or restrain the sheet metal in an edge zone of the die, as the sheet metal is pressed (generally in a drawing direction) by the punch into the die, said tool comprising at least one addendum, typically surrounding the component, and wherein said tool is generated by a method comprising: inputting a component design into a computerized system; inputting a corresponding binder design; establishing a plurality of at least two elevation curve (EC) lines which EC lines are related to the component and binder design; establishing at least one or more spaces between the component and the binder, and any additional elevation curves; and interconnecting the spaces between the elevation curves, preferably with surfaces or a mesh, so as to generate said addendum.

In additional detail, the method for designing a tool for drawing of sheet metal to form a sheet metal component having a predefined component geometry, said tool comprising a die, an optional binder and a punch, whereby the optional binder, when present, is used to position and/or restrain the sheet metal in an edge zone of the die, as the sheet metal is pressed (typically in a drawing direction) by the punch into the die, said tool comprising at least one addendum, typically surrounding the component, wherein said tool design is generated by a method comprising: inputting a component design; inputting a corresponding binder design so as to define a binder geometry; generating said addendum by establishing a plurality of at least two elevation curve (EC) lines which EC lines are related to the component and binder design; establishing at least one or more spaces between the component and the binder, and any additional elevation curves; and interconnecting the spaces between the elevation curves so as to create said addendum; specifying quality or design criteria including blank outline, materials, thickness of the material, lubrication properties, retaining devices such as draw bead, spacer, and binder force, and the like; and thereafter determining tool movements.

Further, in a still further aspect, the present invention also provides a tool comprising a die, an optional binder and a punch, whereby the optional binder when present is used to position and/or restrain the sheet metal in an edge zone of the die, before the sheet metal is pressed in a drawing direction by the punch into the die, said tool comprising at least one addendum typically surrounding the component, and wherein said tool is generated by a method comprising: inputting a component design; inputting a corresponding binder design; establishing a plurality of at least two elevation curve (EC) lines which EC lines are related to the component and binder design; establishing at least one or more spaces between the component and the binder, and any additional elevation curves; and interconnecting the spaces between the elevation curves, preferably with surfaces or a mesh, so as to generate said addendum.

The present invention therefore also provides a tool for drawing sheet metal to form a sheet metal component having a predefined component geometry, said tool comprising a die, an optional binder and a punch, whereby the binder when present, is used to position and/or restrain the sheet metal in an edge zone of the die, as the sheet metal is pressed in a drawing direction by the means of the punch into the die, said tool comprising at least one addendum typically surrounding the component, whereby said addendum complements the component geometry in the edge zone and runs into the component and the binder with a predefined continuity condition, wherein said addendum is generated by a method comprising the following steps: inputting a component design; inputting a corresponding binder design so as to define a binder geometry; generating said addendum by establishing a plurality of at least two elevation curve (EC) lines which EC lines are related to the component and binder design; establishing at least one or more spaces between the component and the binder, and any additional elevation curves; and interconnecting the spaces between the elevation curves, preferably with surfaces or a mesh, so as to create said addendum.

Further, the present invention is also well suited to provide a parameterized process model for forming simulation of a tool using the addendum design approach of the present invention. As such, in a yet still further aspect, the present invention also provides a method to establish a parameterized process model for a forming simulation of a tool for deep drawing of a sheet metal based on a predefined component geometry, said tool comprising a die, an optional binder and a punch, whereby the optional binder is used to position and/or restrain the sheet metal in an edge zone of the die, as the sheet metal is pressed, typically in a drawing direction, by means of the punch into the die, and at least one parameterized addendum which complements the component geometry along at least one component edge, said method comprising the following steps: inputting a component design; inputting a corresponding binder design so as to define a binder geometry; generating said addendum by establishing a plurality of at least two elevation curve (EC) lines which EC lines are related to the component and binder design; establishing at least one or more spaces between the component and the binder, and any additional elevation curves; and interconnecting the spaces between the elevation curves, preferably with surfaces or a mesh, so as to create said addendum.

Using the parameterized process of the present invention, forming simulations of the tool used for drawing can be easily utilized. As such, in a still further aspect, the present invention also provides a forming simulation of a tool for drawing of a sheet metal blank, wherein said forming simulation comprises a parameterized process model for a forming simulation of a tool for drawing of a sheet metal based on a predefined component geometry, said tool comprising a die, an optional binder and a punch, whereby the optional binder, when present, is used to position and/or restrain the sheet metal in an edge zone of the die, as the sheet metal is pressed, typically in a drawing direction, by means of the punch into the die, and at least one parameterized addendum which complements the component geometry along at least one component edge, said method comprising the following steps: inputting a component design; inputting a corresponding binder design; generating said addendum by establishing a plurality of at least two elevation curve (EC) lines which EC lines are related to the component and binder design; establishing at least one or more spaces between the component and the binder design, and any additional elevation curves; and interconnecting the spaces between the elevation curves, preferably with surfaces or a mesh, so as to create said addendum.

In particular, the present invention facilitates the use of a forming simulation wherein several tool geometries can be analyzed by changing at least one parameter of the tool model. As such, the forming simulation of the present invention can be optimized in an optimization loop by applying quality or design criteria such as thickness, strength, strain, stress, shape, and the like.

As will be clearly understood by the skilled artisan, the practice of the present invention is particularly well suited for applications in a computerized design approach, such as a CAD system, or the like. As such in a yet still further aspect, the present invention also provides a method for determining a model of a geometry of a forming stage in a computer-aided design (CAD)-system, comprising the following steps: inputting a corresponding binder design so as to define a binder geometry; generating said addendum by establishing a plurality of at least two elevation curve (EC) lines which EC lines are related to the component and binder design; establishing at least one or more spaces between the component and the binder, and any additional elevation curves; and interconnecting the spaces between the elevation curves, preferably with surfaces or a mesh, so as to create said addendum.

The resulting addendum design can be directly used to control the machinery used to produce or prepare the die, the punch or the die tool, or the like.

The program used in the practice of the present invention can be stored locally on a computer, or local network, or can be accessed over a network system such as the Internet, or the like. The program might also be stored or accessed using various computer readable storage devices, including for example, CDs, DVDs, temporary storage devices such as USB flash drives, and the like. Preferably, the program and the like are stored on non-transitory computer readable medium.

The program can be operated on any suitable computer or data processing system for determining a model of a geometry of a forming stage in a computer-aided design (CAD) system contains memory means with computer program code means stored therein, which describe a computer program, and data processing means for carrying out the computer program, wherein the implementation of the computer program leads to the implementation of the method according to the invention.

The computer program for determining a model of a geometry of a forming stage in a computer-aided design (CAD) system according to the invention may be loaded into an internal memory of a digital data processing unit, and comprises computer program code means which, when they are carried out in a digital data processing unit, cause this to implement the method according to the invention. In a preferred embodiment of the invention, a computer program product comprises a computer-readable medium, and preferably, a non-transitory computer readable medium, on which the computer program code means are stored.

According, in a yet still further aspect, the present invention also provides a non-transitory computer readable medium containing a program, said program being configured to make a computer execute the steps of a method for designing a tool for drawing of sheet metal to form a sheet metal component having a predefined component geometry, said tool comprising a die, an optional binder and a punch, whereby the optional binder is used to position and/or restrain the sheet metal in an edge zone of the die, before the sheet metal is pressed in a drawing direction by the punch into the die, said tool comprising at least one addendum, typically surrounding the component, said tool is generated by a method comprising: inputting a component design so as to prepare a predefined component geometry; inputting a corresponding binder design so as to define a binder geometry; generating said addendum by establishing a plurality of at least two elevation curve (EC) lines which EC lines are related to the component and binder design; establishing at least one or more spaces between the component and the binder, and any additional elevation curves; and interconnecting the spaces between the elevation curves, preferably with surfaces or a mesh, so as to create said addendum; and specifying a blank outline; specifying material; specifying thickness of the material; specifying lubrication properties; specifying retaining devices such as draw bead, spacer, binder force; and determining tool movements.

DETAILED DESCRIPTION OF THE INVENTION

In the present application, the term "component" is used in a general sense, and can refer to any shape, which is to be produced in a drawing operation. While the component design is typically fixed or pre-established, the component design can be modified for the purposes of dieface design, or the final component design might be modified depending on a preliminary addendum design.

Also, while the use of this technology is of particular interest in the production of automotive-related parts, it will be understood by the skilled artisan, that the present invention can be used in the design of a wide variety of parts, for use in automotive, or other applications.

Accordingly, while the present application is described with particular reference to the automotive industry, the skilled artisan would be aware that the present application is equally applicable in other applications. In fact, the process of the present invention can be applied to any drawing operation.

Also, while the process is typically directed to the design of an addendum to be used in the production of a finished component, it will be understood that the process of the present invention can be used to design other features, including for example, the binder and/or blank surfaces to be used in the final drawing operation. As such, the approach of the present invention can also be used to optimize the design of the binder or blank, or other intermediate designs, based on the final component design. For example, the approach of the present invention can be used to optimize the addendum based on the component design, as well as for the design of the various blank or binder surfaces.

The invention presented herein therefore reveals a method, which makes it possible, by starting out from the component geometry, to rapidly establish a parameterized addendum model, and when required, a parameterized process simulation model for a costing, forming and process planning feasibility based thereon. This approach permits early review of the feasibility of a design using different types of assessments, particularly by taking into account addenda effects. The current invention greatly simplifies the design parameterization parameters in order to generate global parameters that allow the tool geometry, the addendum, and the overall process to be varied with very few scalar parameters. This allows the addendum, and thus the die design, to be assessed, fine-tuned, and optimized, more rapidly, and with greater ease, than when using prior art techniques. Consequently, production of the die and tool design can be controlled using the addendum design approach of the present invention.

It is to be noted that the approach of the present invention preferably does not use or adopt any addendum section line-based technology, as used in the prior art and hence, the process and method of the present invention can be referred to as a "sectionless" addendum design approach. In some cases however, localized use of a section line approach might be used. Typically, and preferably though, the use of a prior art section line approach is eliminated altogether so as to provide a completely sectionless approach to addendum design.

As a result of the technique of the present invention, there is typically no need for component geometry preparation or edge smoothing techniques as required in other prior art technologies. Moreover, there is also little or no concern as to any specific direction/alignment, number of intermediate sections, section interpolation techniques, or characteristic points on sectional profiles, or concern with the smoothing of characteristic lines, or section overlap issues. This greatly simplifies the computerized processes required for designing and formulating the addendum design, the die design, and/or the use of the die design in die design simulations.

The present invention therefore provides an improved method for the development of a parametric model of the tool surfaces. In particular, the computerized approach to the addendum design of the present invention, can be used to export the completed design to various Die manufacturing equipment in order to produce a die for use in the product of the part. According, the present invention provides a ready means for designing and producing a die, or tool, adapted to incorporate the die design resulting from the addendum design process of the present invention.

During production of the die from the addendum design process of the present invention, the die design can be modified to account for various processing parameters. For example, offsetting of the tools, if so required, can also be automatically carried out.

Draw depth can also be used as an input, and as such, a changing of the draw depth can be easily accommodated. Further, design features including the binder position and orientation, as well as die design features including the punch opening line (POL), the die opening line (DOL), the Punch and Die profile radii, or the like, can automatically result in a parametric and associative change of the part tool design.

Parametric creation of the draw bead lines, and outer material edge at end of forming can also be manually or automatically generated on the binder at a predefined constant or variable distance from the DOL, or from some other characteristic line of the addendum. Also, as previously mentioned, parametric creation of the binder, as an intermediate step prior to the final drawing operation, can also be used.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1A:
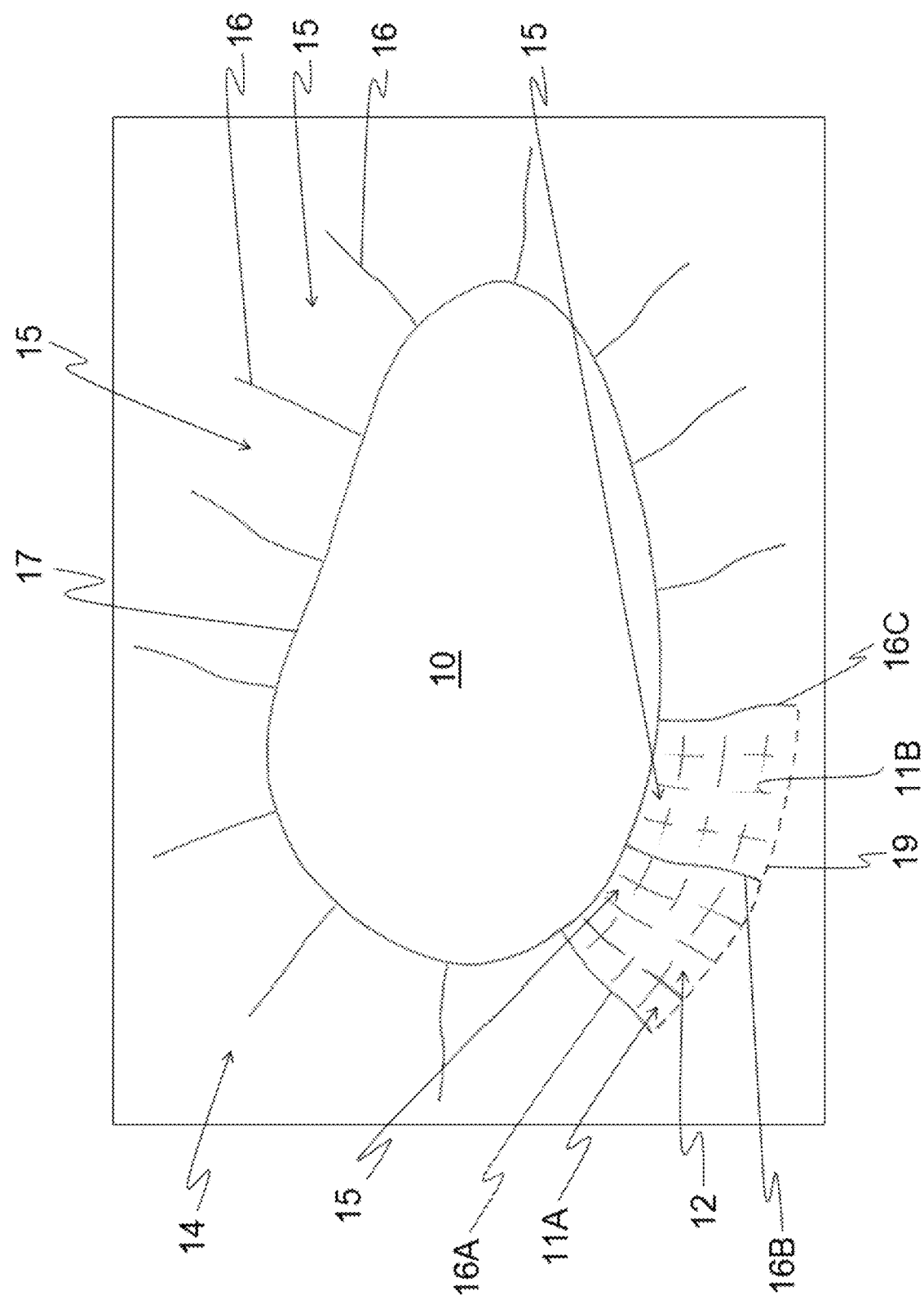
FIGS. 1A, 1B and 1C are plan and perspective views of a part, addendum and binder, showing the technique of addendum design, and the die punch apparatus, according to the prior art.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. However, unless otherwise specifically noted, all of the features described herein may be combined with any of the above aspects, in any combination.

For simplicity with respect to the drawings, it will be hereinafter assumed, to simplify the description, without limiting the scope of the invention, that the forming tools in the drawing process move in a global z-coordinate direction, designated as vertical and accordingly the (x, y-directions) are designated as being horizontal. It is further assumed for simplification, that the component is undercut free, i.e. the projection in the z-direction onto a horizontal plane shall have a one-to-one correspondence.

Figure 1B:
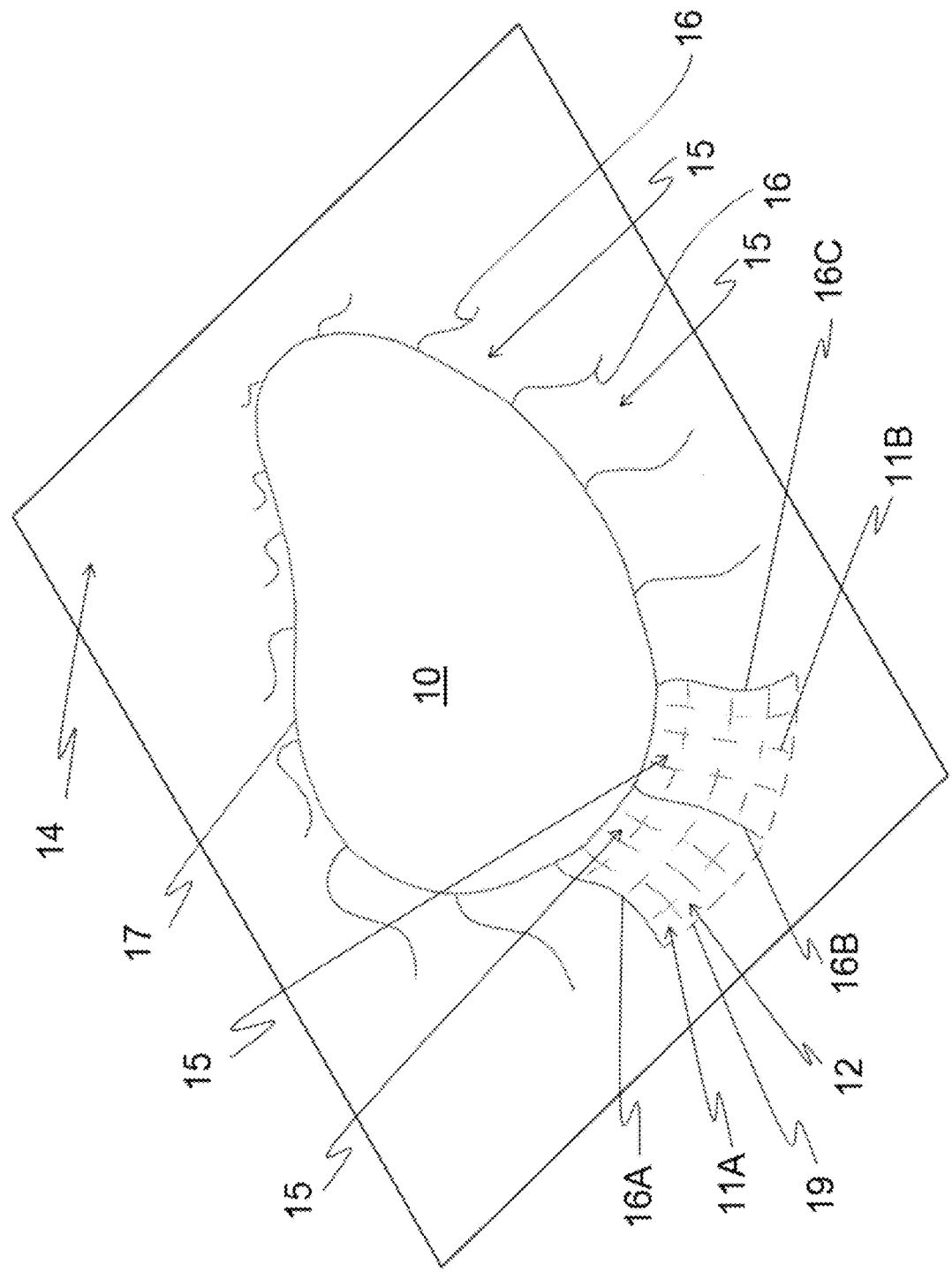

In FIG. 1A, a plan view of a component design 10 is shown, and in FIG. 1B, a perspective view of the same component design 10, is shown. In FIGS. 1A and 1B, the process of addendum design according to the prior art section line approach, is demonstrated. In FIGS. 1A and 1B, the design of component 10 is shown surrounded by addendum 12, which is attached to binder 14. It will again be emphasized that throughout this operation, and any following discussions, that component 10 is preferably not modified in any way since the shape of component 10 has been pre-established.

A plurality of section lines 16, are shown which extend essentially perpendicularly to a point on a component edge line 17, at the edge of component 10, and extend to a point on binder 14. In practice, a first section line 16A is established that runs from the component edge line 17 to binder 14. Line 16A is modified to account for various design parameters that affect the drawing operation such as blank thickness, material flow, and the like. Line 16A is then further modified in order to provide suitable continuity conditions at the component 10 and the binder 14, to the component edge line 17 to binder 14, respectively. Once these continuity conditions are met, the section line 16A for that section of component 10, has been established.

Once the first section line 16A is established, a second section line 16B, typically adjacent to the first, is again established, which runs from a different point on component edge line 17 to a different point on binder 14. Second section line 16B is also modified so as to again provide suitable properties and continuity conditions at that second point on the component edge line 17, and at the binder 14. As such, component 10 now has two section lines 16A and 16B, extending from its edge, to binder 14. This process is repeated, such as is shown as section line 16C, until component 10 is essentially surrounded by numerous section lines 16. In the present drawings, only a small number of section lines 16 are shown. In practice, calculation of a large number of section lines would be required, and the number of calculated section lines required would increase significantly depending on the complexity of the part.

Once all of the initial section lines 16A, 16B, 16C etc., have been determined, any intersections, overlaps, or the like, of the section lines 16, are modified and/or adjusted, as required to eliminate these conditions. After this adjustment, the component is surrounded by a series of modified section lines 16A, 16B, 16C etc. which provide acceptable design parameters, and acceptable continuity conditions, and which section lines are free of overlaps, and the like.

At this stage, section lines 16 are separated by numerous spaces 15. A surface 11A is added between section lines 16A and 16B, and a surface 11B is added between section lines 16B and 16C, and so on, so as to fill all of the spaces 15 with a plurality of surfaces (generally designated as 11), between all adjacent section lines 16. In practice, surfaces 11 (or alternatively, a mesh or other design might be used) are simply filled in the spaces 15 between section lines 16A, 16B and 16C, and the like, using known techniques, and thus provide a collection of initial surfaces 11 between all adjacent section lines 16. The initial surfaces 11 can then be adjusted to provide acceptable smoothness or continuity conditions between adjacent surfaces 11A, 11B, and the like. As a result, all of the surfaces 11 can be interrelated one to the other, so as to prepare a suitable overall geometry for the collection of surfaces 11.

It can be noted that the collection of surfaces 11 surrounding component 10 meets the binder 14, resulting in an intersection 19 of addendum 12 and binder 14. Moreover, the collection of surfaces 11 forms addendum 12, and an addendum 12 has now been calculated that establishes a first approximation of a suitable addendum 12 between component 10 and binder 14.

Figure 1C:
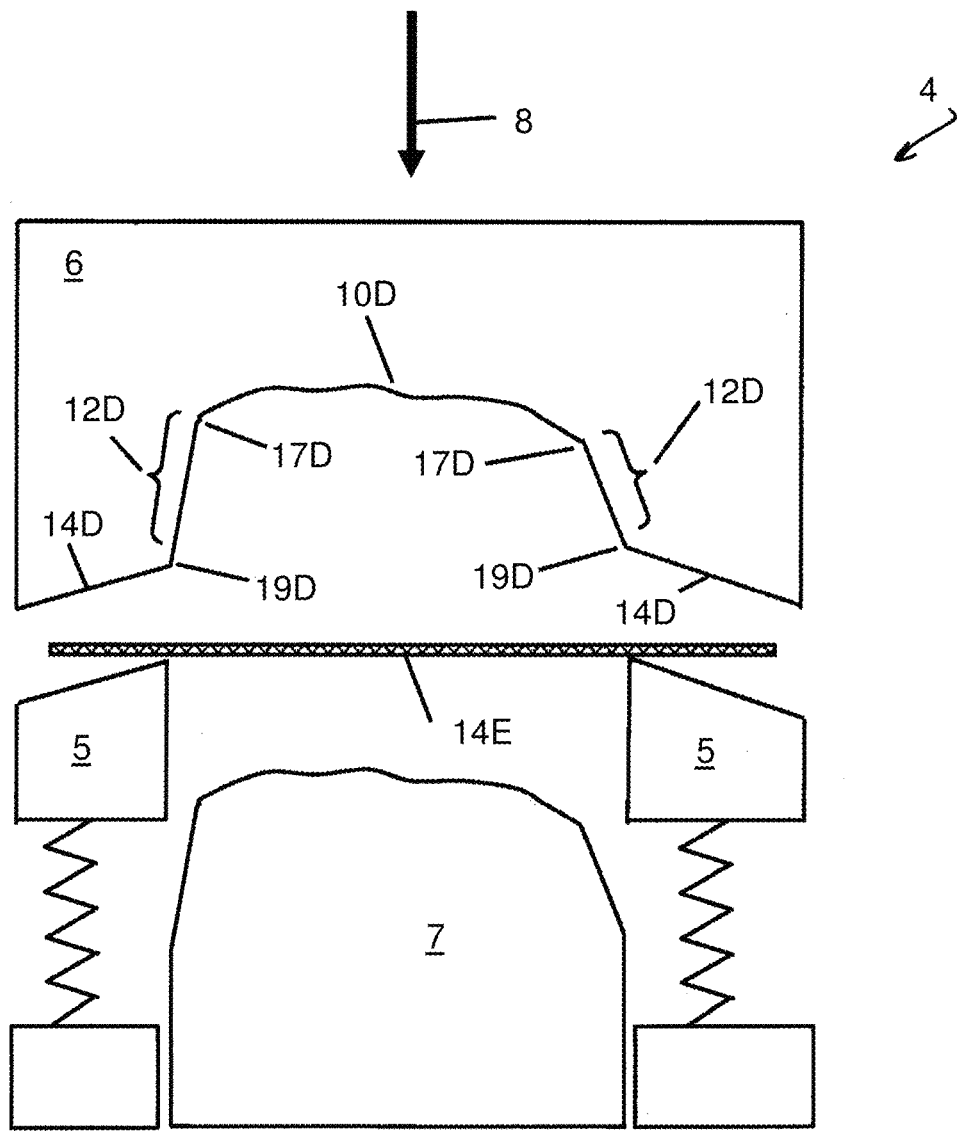

A die and punch can then be produced to make component 10 in a typical press operation, which is shown in FIG. 1C. Shown in FIG. 1C, binder (or blank) 14, which is typically a sheet metal plate, or the like, is inserted into a press, generally designated as 4. Binder 14 rests on a blank holder 5, and is located between a die cavity 6 and a punch 7. In a typical press operation, the component 10 is created in the binder 14 when the die cavity 6 is pushed down onto punch 7 in the direction of the draw axis, as indicated by arrow 8.

It will be noted that die cavity 6 includes a component portion 10D related component 10. Around component portion 10D is a binder portion 14D related to binder 14. Between component portion 10D and binder portion 14D, is an addendum portion 12D which relates to addendum section 12.

Typically, the boundary 17D between addendum portion 12D and component portion 10D relates to component edge line 17D (also referred to as the trim line). The boundary 19D, between binder portion 14D and addendum portion 12D defines the intersection 19 between addendum 12 and binder 14. This intersection can also be termed the punch opening line.

In use, a binder 14 (of suitable shape and size) is positioned between die cavity 6 and punch 7. Die cavity 6 is then pressed downwards in the direction of the draw axis, as indicated by arrow 8. Blank holder 5 also moves downward, and thereby allows punch 7 to be inserted into die cavity 6. As a result, binder 14 is reshaped so as to form component 10, addendum 12 and leave a residual section of binder 14. Die cavity 6 is then lifted, and the shaped binder is removed, for further processing.

If properly designed, the addendum 12 formed around component 10, allows component 10 to be formed without any defects, or unacceptable features such as wrinkling, tearing, or the like. Component 10 can then be cut from binder 14, in a trimming operation. In a simple design, the process might be terminated at this point. However, more complex component designs may require the use of additional section lines, and/or further modification of the section lines. For example, more complex parts, or the use of a sausage design for optimizing the drawing operation, can result in the need for additional section lines. Similarly, the addendum may require modification if unacceptable conditions arise, such as excessive concavity, draw depth, wrinkles, rough or jagged edges, or the like.

Moreover, it will be clearly understood by the skilled artisan, that changes in the component design, or any of the addendum design parameters, will result in the need to modify and/or re-design section lines 16, to again optimize the addendum design. This leads to excessive calculation requirements as the section lines 16, and interconnecting surfaces 11, must now be re-calculated for the entire component. As a result, this prior art approach is complex, and typically requires the guidance of a skilled design operator. Further, if this design model is used for computer simulation of the addendum design, modification of the design will be complex, and will generally also require the guidance of a skilled operator to provide a suitable addendum design simulation.

In contrast, the present invention will now be described with respect to several different design options, in order to highlight the flexibility of the technique described herein, and demonstrate the ease of calculation. These features will be described with respect to a variety of different cases.

Case 1

Figure 2A:
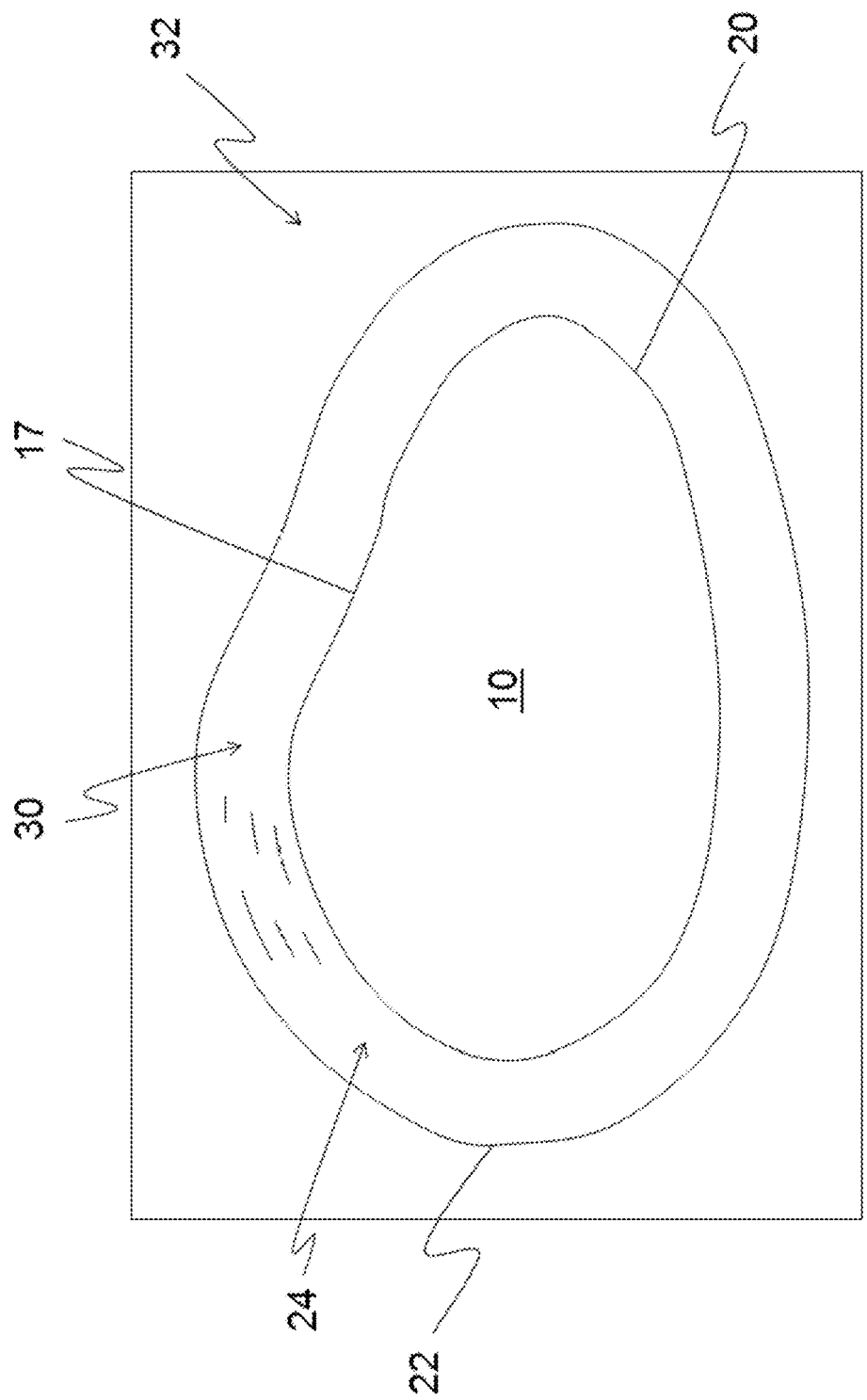
FIGS. 2A and 2B are plan and perspective views of the same part, addendum and binder of FIGS. 1A and 1B, showing the technique of addendum design, according to the present invention.
Figure 2B:
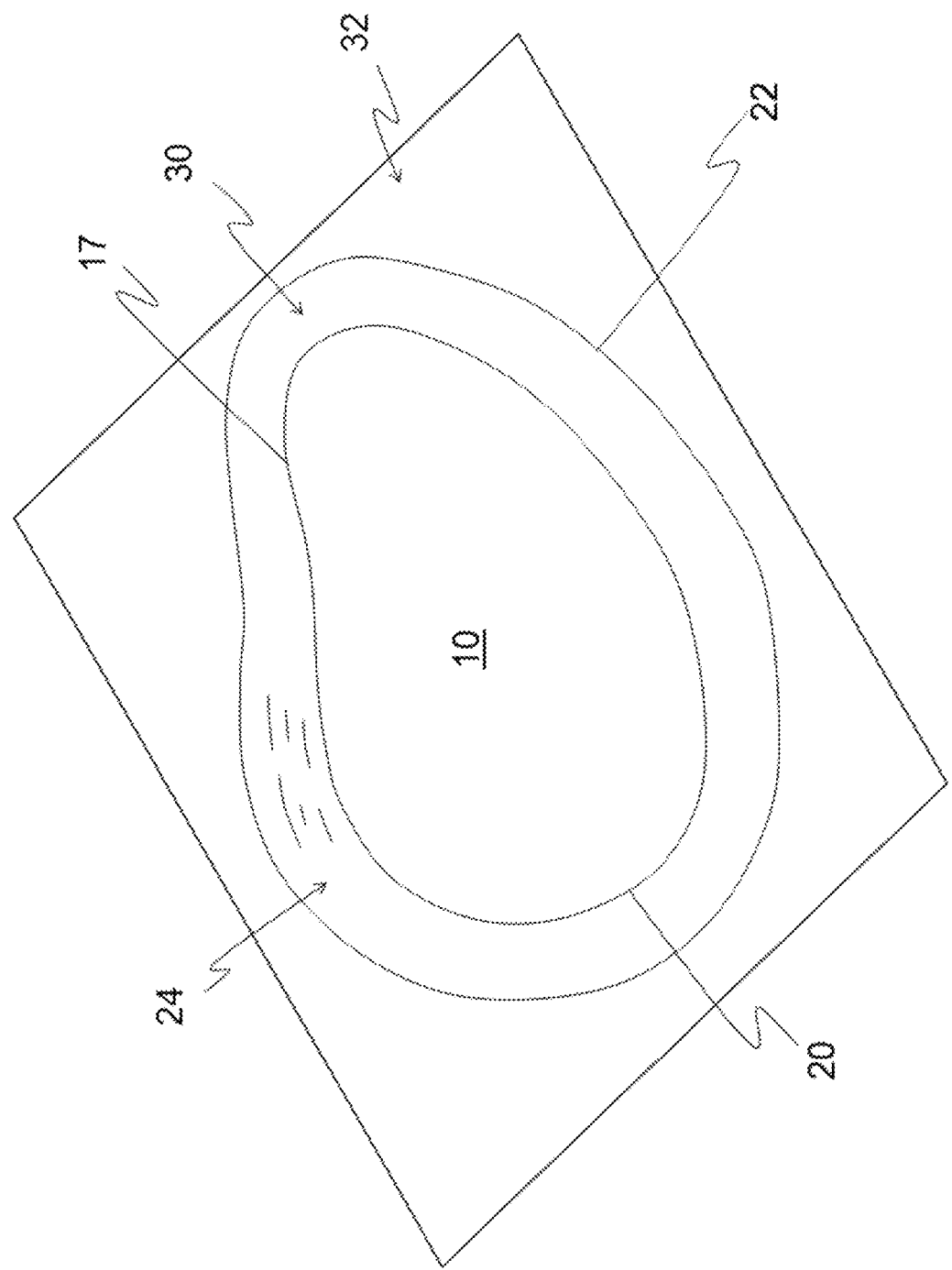

In FIGS. 2A and 2B, the design of the same component 10 of FIG. 1, is provided using the technique of the present invention. This simple case is defined as Case 1.

As in the technique of FIGS. 1A and 1B, the design geometry of component 10 is pre-established, and is not normally modified. As such, component 10 and component edge line 17 are the same as in FIGS. 1A and 1B. In FIG. 2A, a plan view of the part of the present invention is shown, and in FIG. 2B, a perspective view of the component 10, is shown. Addendum 30 and binder 32 are also shown.

In Case 1, for a simple component 10, the addendum is designed using only two elevation curve (EC) lines. In the approach of the present invention, EC lines are created manually, automatically or semi-automatically. For this simple embodiment, component edge line 17 is also used as a first elevation curve 20 (as "ECc"). A further EC line 22 is established on the binder 32 (as "ECb"), and ECb therefore also acts, in this case, as a binder edge line.

It will be noted that in contrast to the numerous section lines of FIGS. 1A and 1B that extend perpendicularly from the part to the binder edge, the EC lines 20 and 22 of the present invention typically run more or less parallel to the component edge line 17. They do not normally provide a connection between component edge line 17 and binder edge line 32, however in some situations, these lines can overlap. In the approach of the present invention, the numerous section lines 16 of FIG. 1 have therefore been replaced with the two elevation curves 20 and 22 of FIGS. 2A and 2B.

It can be noted in FIG. 2A, that in plan view, ECb 22 lies outside of, and is offset from, line ECc 20. Also, it can be noted that in FIGS. 2A and 2B, component edge line 17, or its coincident (in this case) elevation line ECc 20, can be represented by a solid line, or a polyline around component 10.

Figure 2C:
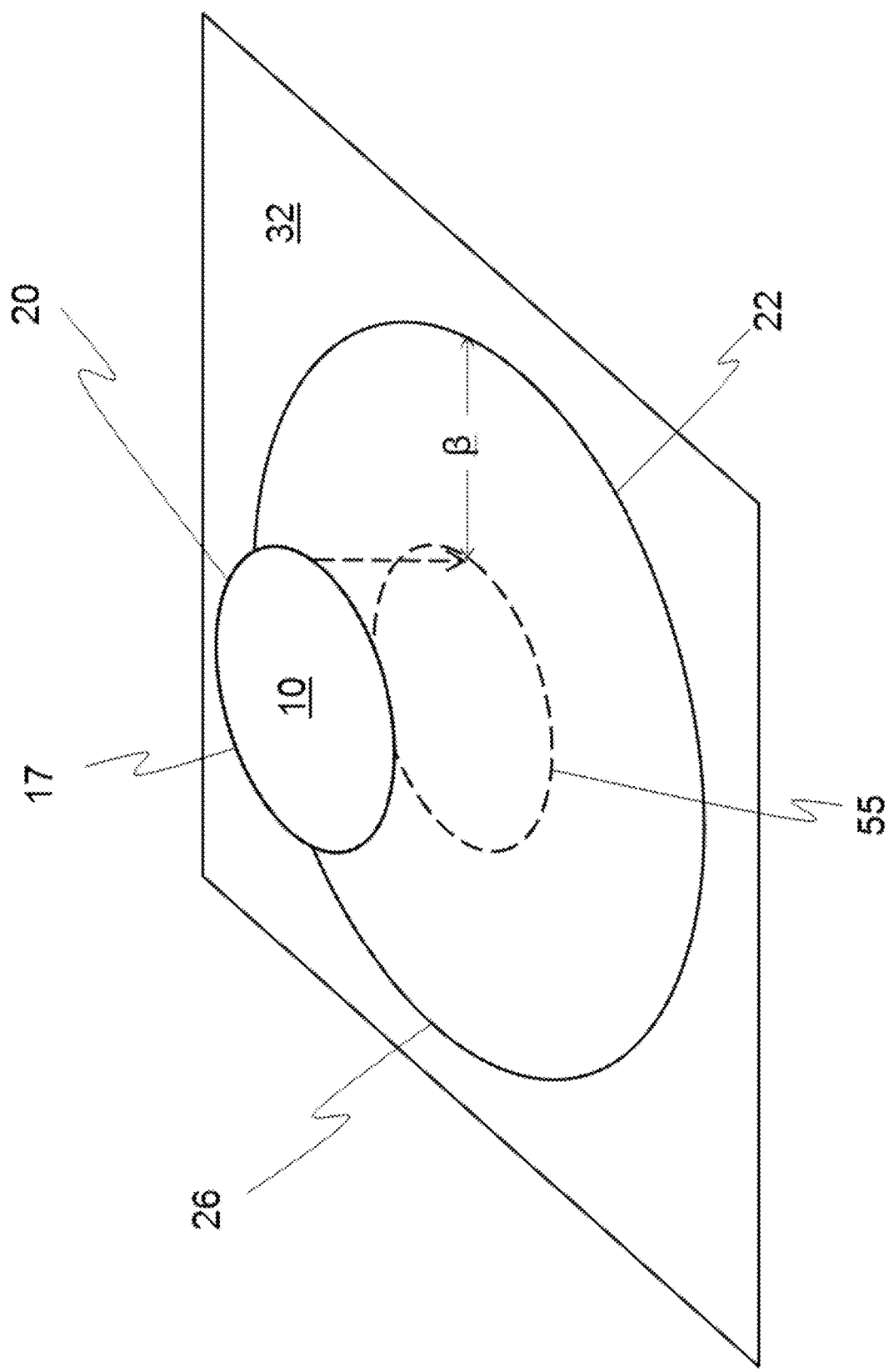
FIGS. 2C to 2G are plan or perspective views of parts of an addendum which demonstrate mechanisms for modification of a selected elevation curve.

From ECc 20, line ECb 22 can be established in a variety of manners. For example, in a first technique for determining ECb 22, a normal projection of the ECc line 20 is first projected onto the binder, as line 55, as seen in FIG. 2C. The projected line 55 is then made larger, by extending the line outward by an offset amount (3, to prepare a first approximation of line ECb 22, as line 26. The projected ECb line 22 is thus offset (manually or automatically) outwardly (for the case of outside-of-part addendum) along a normal direction at elevation line ECc 20, with an offset distance (3, in order to obtain ECb 22. As a result, ECb 22 is always outside of ECc 20.

Once it has been approximated as line 26, ECb line 22 can be refined to smooth the projected ECb line, and to account for various conditions, including for example, draw depth, tooling clearances, trim line allowances, wall angles, the type of addendum, the expected forming severity, and the type of material, among other parameters. Examples of these types of adjustments are described as follows. However, it will be clear to the skilled artisan that various procedures can be used to modify the first approximation of ECb 22 in order to obtain the final version of ECb 22.

Figure 2D:
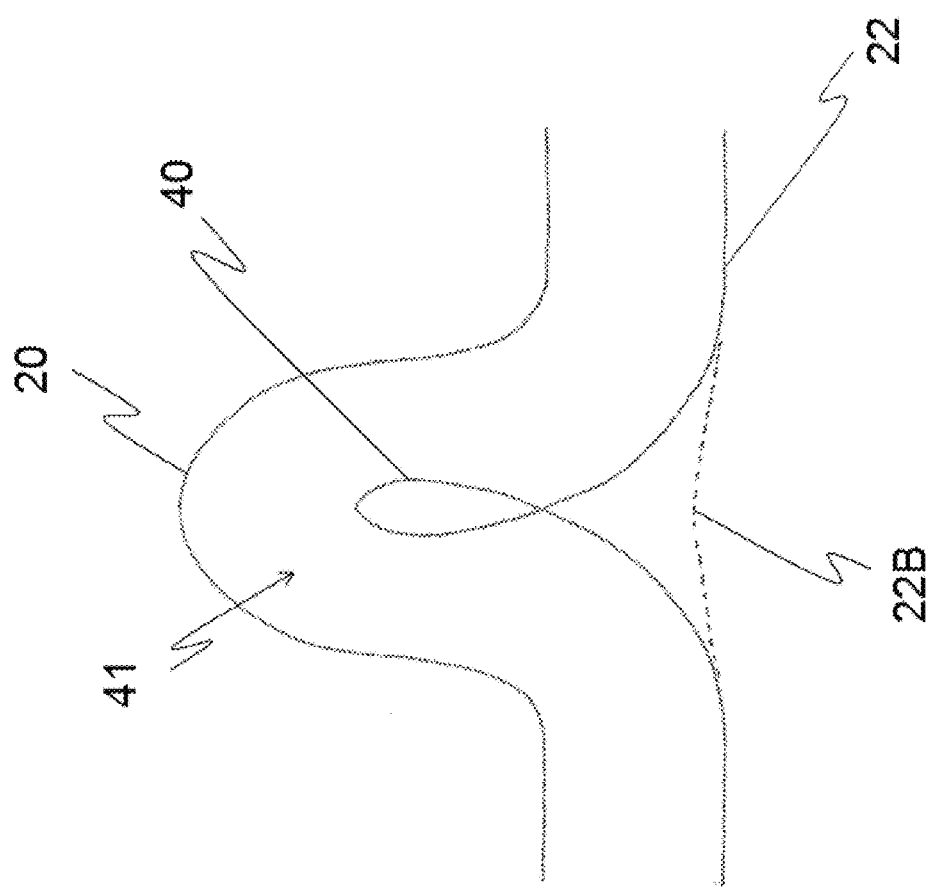
Figure 2E:
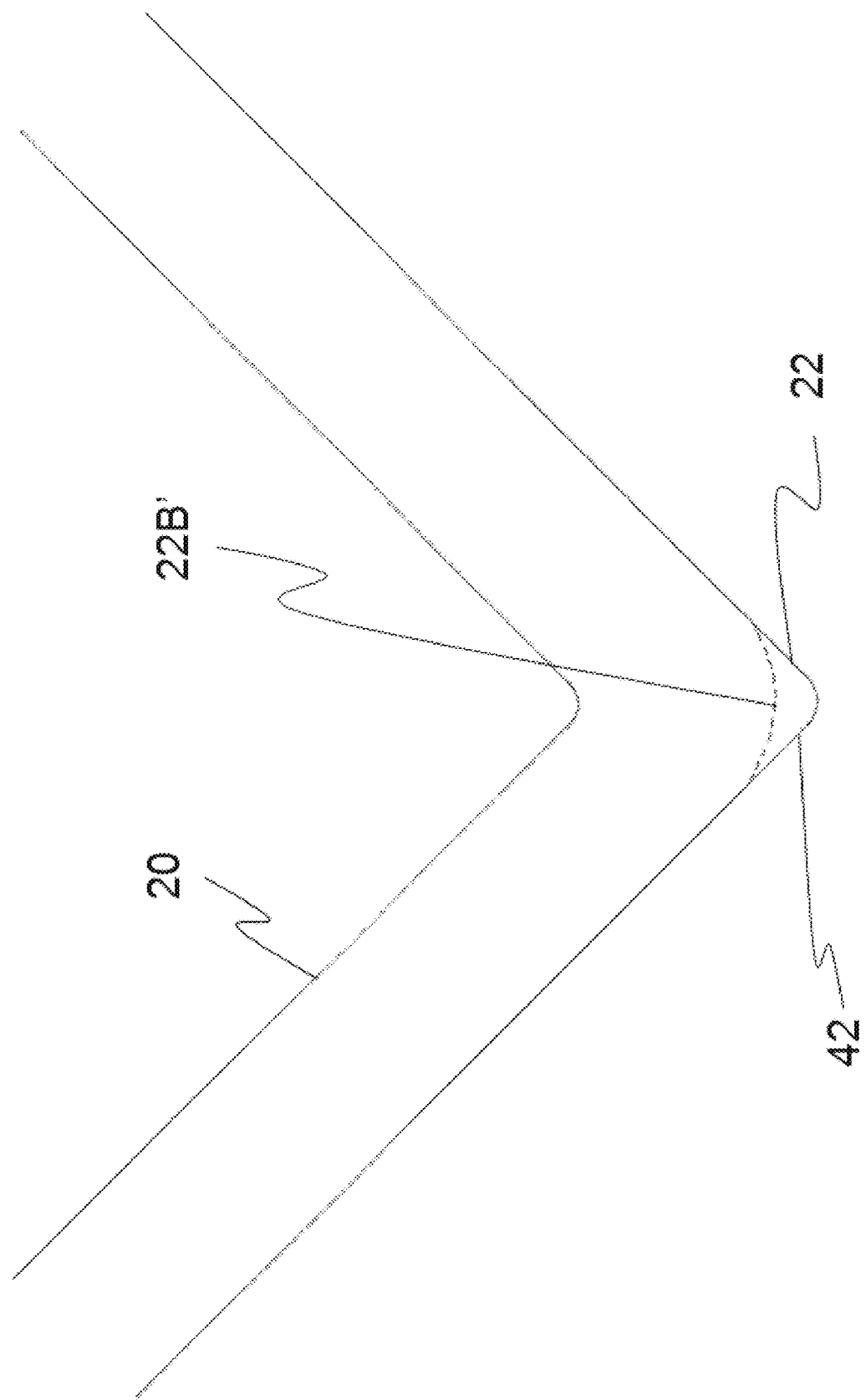
Figure 2F:
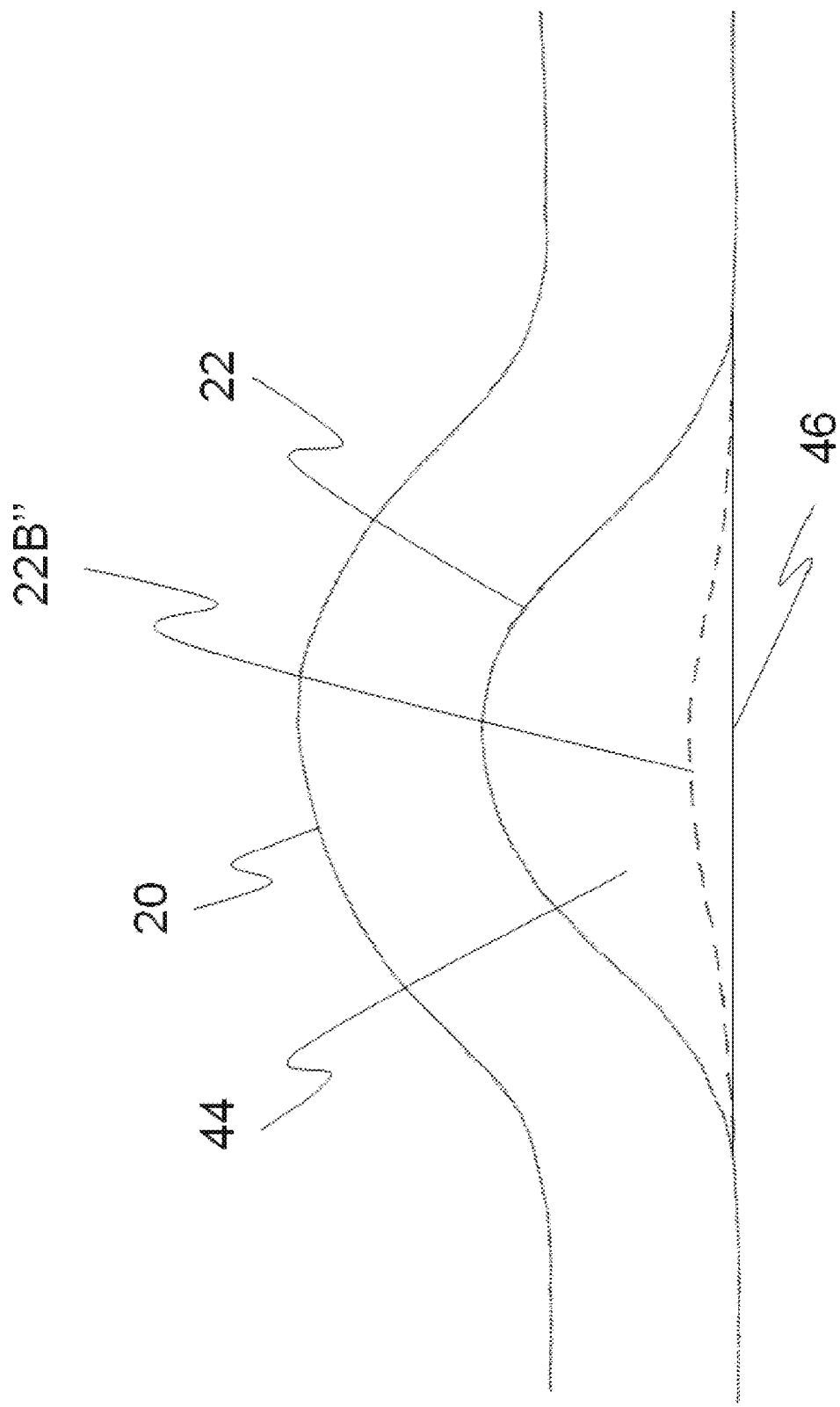

In this example, ECb 22 might be further processed through any or all of the following steps:

a) ECb line 22 self intersections 40, shown in FIG. 2D in plan view, resulting from a concave section 41 of ECc line 20, are removed so as to result in ECb second approximation line or section, 22B;

b) In FIG. 2E, approximated ECb 22 is smoothed by cutting a somewhat sharp polyline corner 42 on line 22, in 3D space according to a polyline subdivision scheme. This results in a further smoothed ECb 22B'; and c) Concavities 44 of ECb 22 can be reduced, if desired, by iteratively decreasing the distance between the concave boundary of ECb 22 to its chord line 46 in a plan view, as seen in FIG. 2F. This procedure can be performed piecewise, either manually or automatically, for each concave area. In one possible approach, for example, each point on the concave section of ECc 22 is projected towards chord line 46. The distance from the point to the chord line is calculated, and a new point is created to reduce the distance between ECc 20 and chord line 46. The procedure is iterated until the necessary or desired convexity in ECb 22B", is reached.

Modification of the ECb line 22 can be done automatically based on design parameters established by the user. For example, the typical design parameters that can control the creation of the modified ECb line 22B in FIGS. 2D, 2E and 2F, are typically controlled using three scalar values, namely; 1. offset level; 2. smoothness level; and 3. concavity level. The degree of correction or modification of any or all of these parameters can be adjusted manually, or automatically.

In any case, once ECc 20 and the modified (or final) ECb line 22 have been established, a surface (or alternatively a mesh) is created between the two lines. For the example in FIGS. 2A and 2B, a surface 24 connecting ECc 20 and ECb 22 and meeting the C0, C1 or C2 continuity conditions at ECc 20 and ECb 22, is created. This is preferably automatically done using a computerized approach.

The ECc 20 continuity conditions are preferably inherited from component part 10, while the ECb 22 continuity conditions are preferably inherited from binder 32. Surface 24 joins the ECc and the ECb and meets the inherited continuity conditions, in order to establish a first approximation of addendum design 30. The final shape of addendum 30 can also be controlled by the same parameters used in controlling the EC lines, namely tension, smoothness and concavity. Other parameters can include continuity, curvature, radii, draw depth, draft angle, clearances, and the like, might also be used to create a parameterized addendum design. In addition, methods that provide other features, such as minimizing addendum area, or minimizing the energy required for addendum deformation, can also be utilized. Using these parameters, the first approximation of addendum 30 can be adjusted to provide a final addendum design.

At this stage, the addendum design is ready to be used.

Figure 2G:
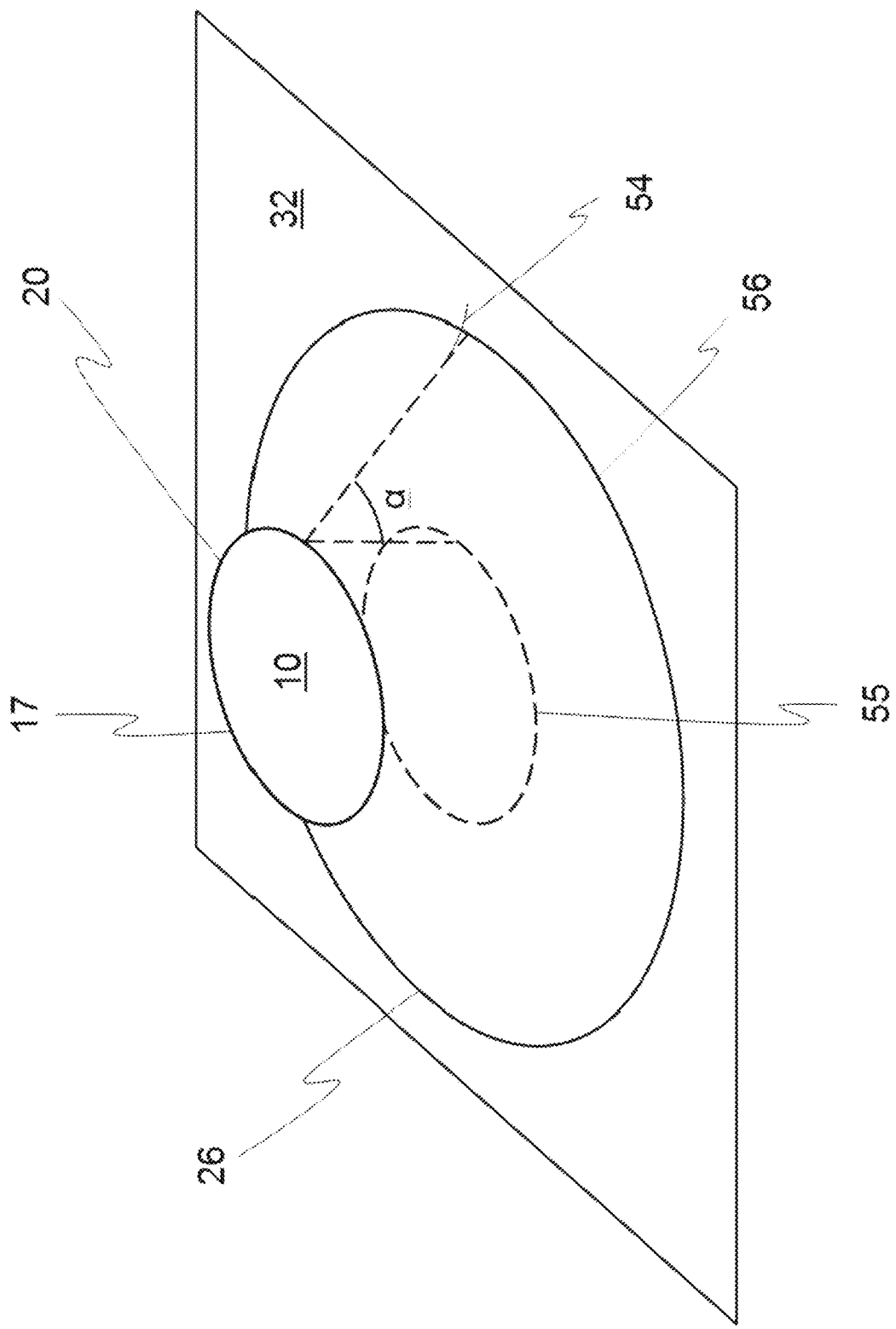

While this approach can easily be used, as previously indicated, ECb 22 can be first approximated in a variety of other fashions. For example, in another approach to provide a first ECb approximation, ECb 22 can also be calculated by a simple draft projection which is angled from ECc, to the binder 14, and thus establish a different ECb 26', as shown in FIG. 2G. In FIG. 2G, a side perspective view of ECc 20 is shown, with an angled projection a of approximately 5° (or any other preferred value of a between 0.1 and 80°, more preferably between 0.2 and 45 degrees, and most preferably between 0.5 and 10 degrees), to create a line 56, which acts as a first approximation of ECb 26 on binder 14. If a is 0, ECc is merely projected onto binder 14, as line 55, as was mentioned above.

When a is greater than 0 however, line 56 is projected around the outside of line 55, and creates a first approximation of ECb 26'. Again, at this stage, ECb 26' can be adjusted to reflect smoothing, draw depth etc., as previously mentioned. Additionally, ECb 26' can be filleted, as shown at 54, in order to produce a further modified ECb line (not shown).

Again, once ECb 26' has been finalized, the addendum can be determined, as previously described.

As such, two methods for determining ECb have been provided which are based on an offset approach, and the offset approach can be determined based on factors such as offset distance, offset angle, continuity conditions at EC lines, forming radii, clearances, draw depth, minimum blank requirements, forming severity, and the like.

However, it should be noted that while the two approaches described hereinabove in Case 1 provide different methods to calculate a first approximation of ECb, numerous other approaches to establish ECb are possible. These might include, for example, creating ECb as a smooth polyline by directly picking polyline points on the binder, editing ECb by moving it in a tangent direction to the binder, importing a 3D curve from some other computerized design system, or the like.

It should also be noted that once the final addendum design 30 has been prepared, the addendum design can now be used for simulations of the drawing operation. If necessary, the addendum design 30 can be further adjusted, modified or optimized in order to address any additional design parameters. Recalculation of the addendum using this approach is far simpler than the prior art, section line approach, and is more intuitive for a user. As such, the system is easily used by less skilled users.

For example, in a computerized simulation environment, the user might be provided with on-screen images to control or adjust the properties of the addendum design. These different mechanisms might enable the user to control, for example, the tension and angles of the addendum, and the like. Control of these parameters might be controlled using, for example, devices such as on-screen sliders or the like, or by inputting direct numerical values, when desired.

It should also be noted that the design parameters used for the addendum design, can be used, modified or adjusted on a global basis (that is, that they control the properties of the entire addendum design) or they can be used, modified or adjusted on a smaller, local scale, in order to control the addendum design parameters over a smaller section of the total addendum design. In this manner, fine tuning of the addendum design in more complex designs can be easily accomplished.

Case 2

Figure 3A:
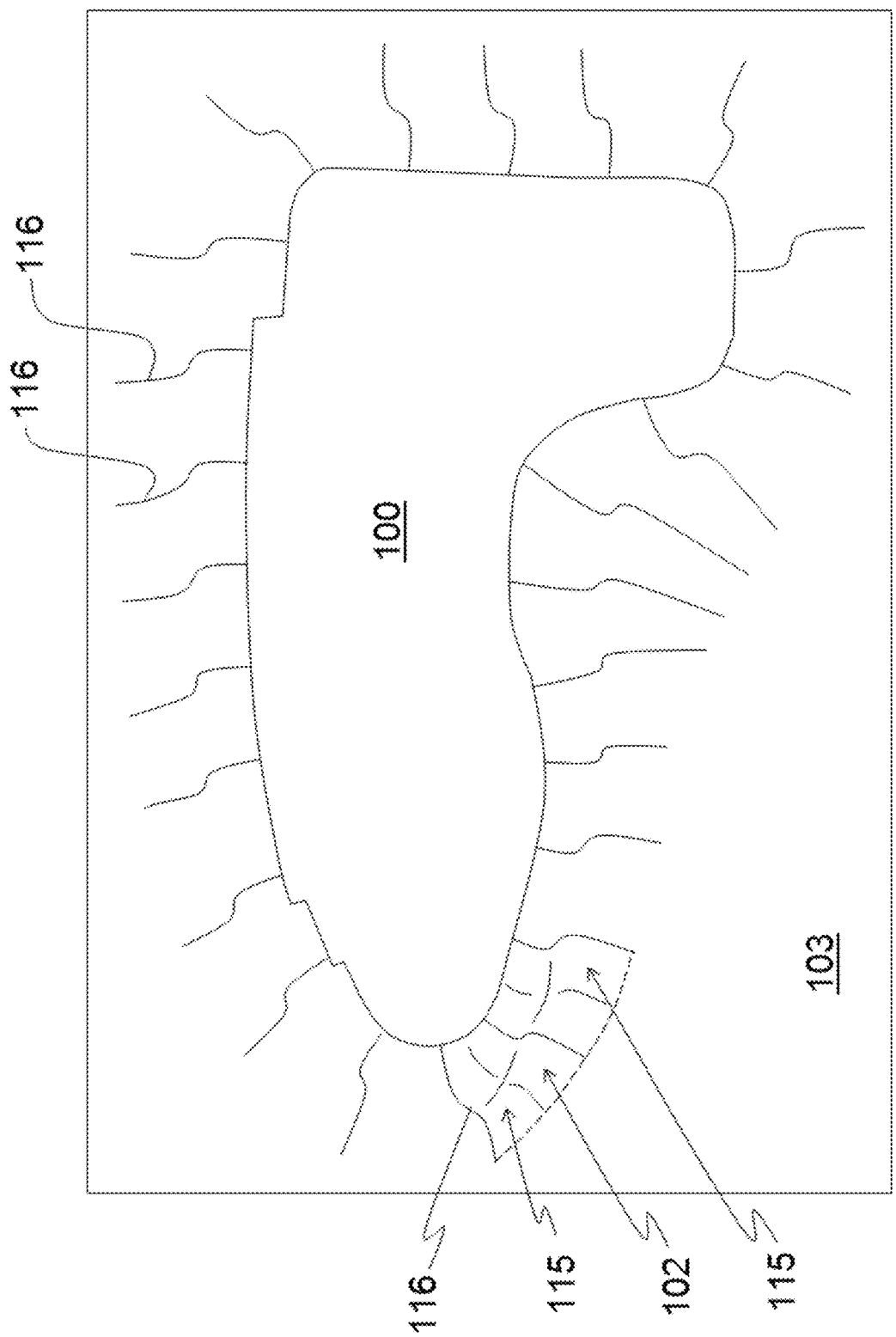
FIGS. 3A and 3B are plan and perspective views of a part, addendum and binder, showing the technique of addendum design for a more complex part, according to the prior art.
Figure 3B:
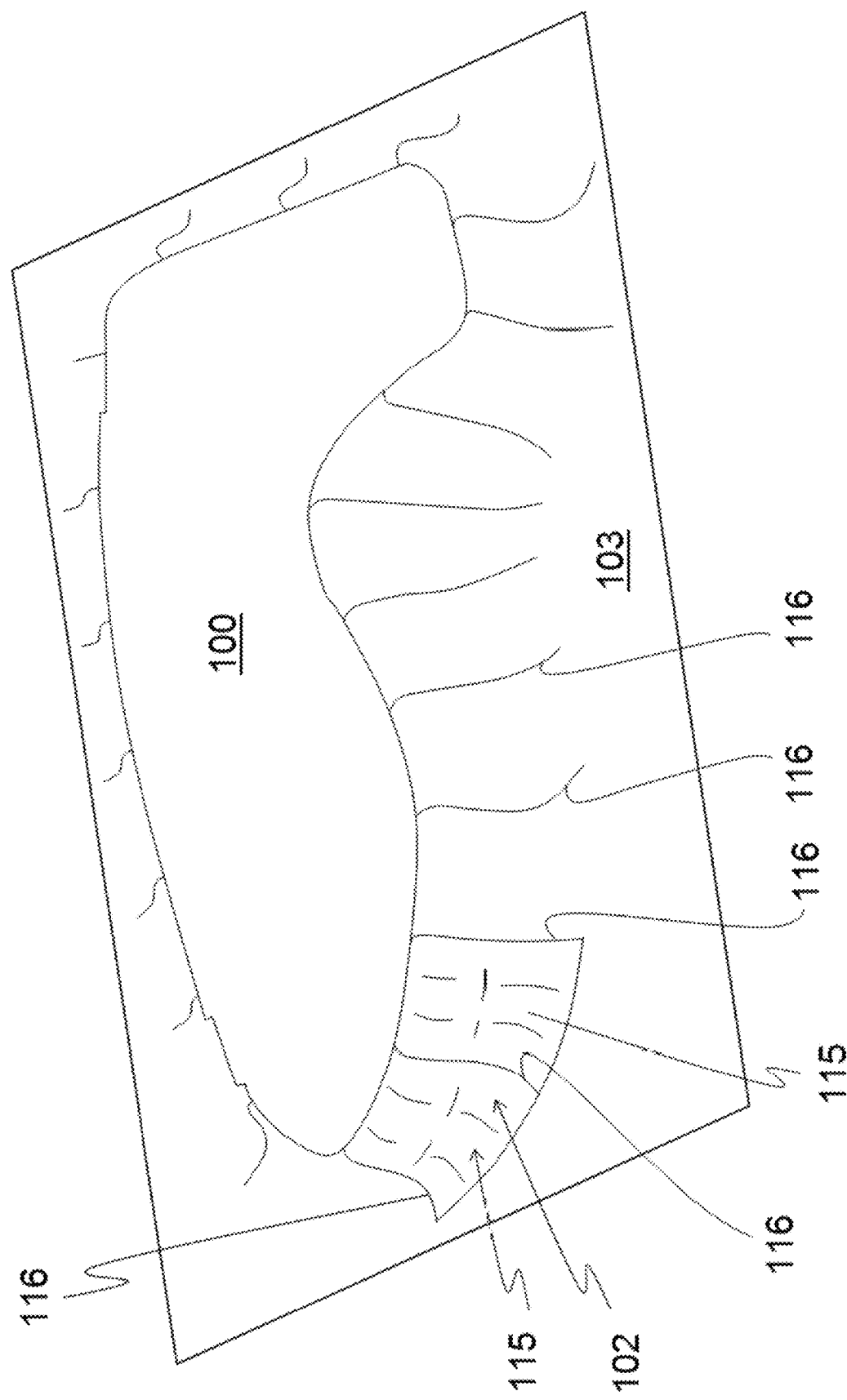

For parts or components of increasing complexity, the prior art use of section lines can be even more problematic. As seen in plan view in FIG. 3A and perspective view in FIG. 3B, a more complex component 100 is shown, with an addendum 102 and having a binder 103. In the prior art approach, in order to provide an addendum design, a large number of section lines 116 would be required in order to create numerous surfaces 115, and the interrelation of these section lines 116 and surfaces 115, one to the other, creates a significant use of resources.

Figure 4A:
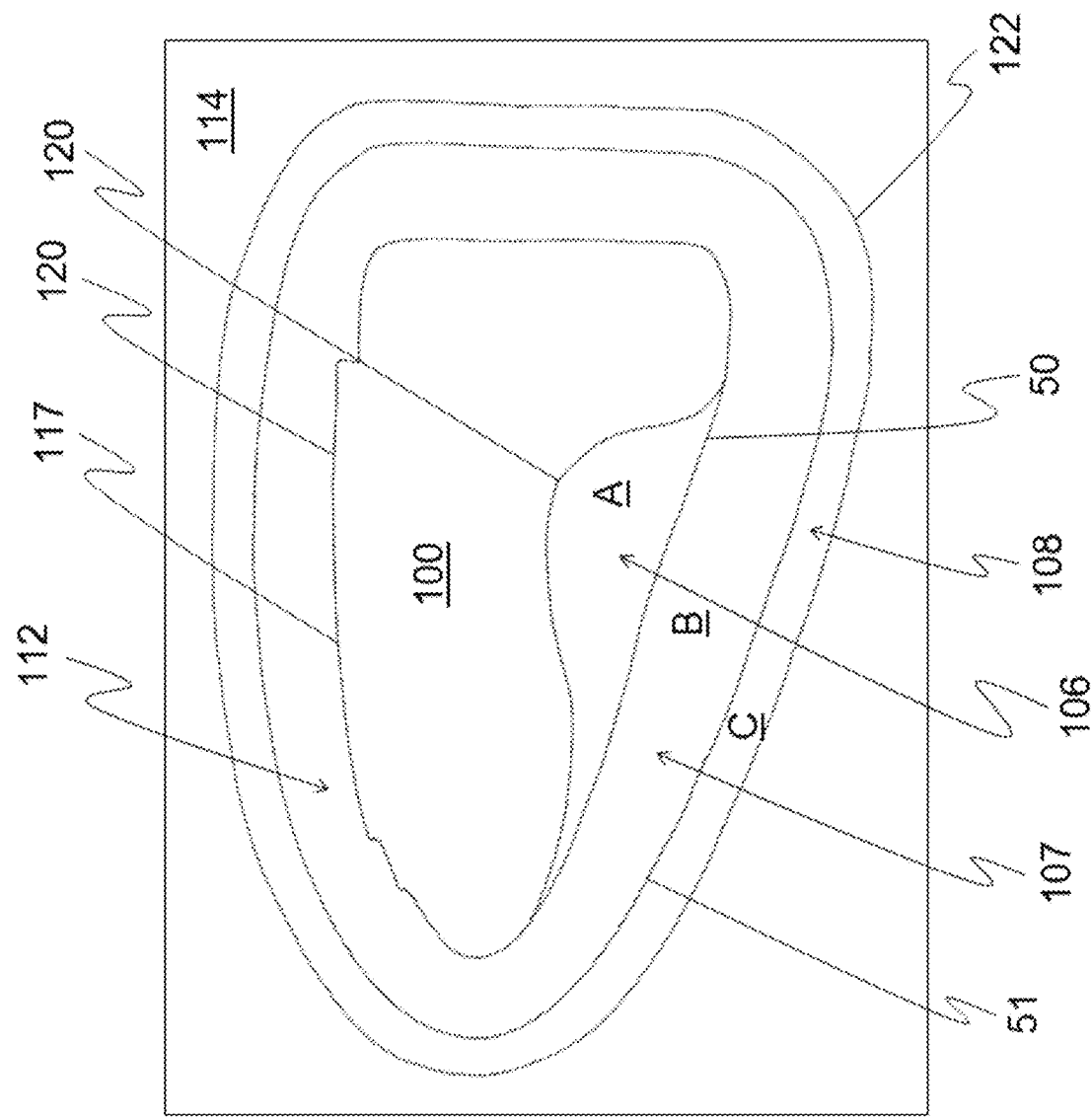
FIGS. 4A, 4B, 5A and 5B are further plan, perspective and cross-sectional views showing the method of addendum design, of the present invention, for increasing complex situations.
Figure 4B:
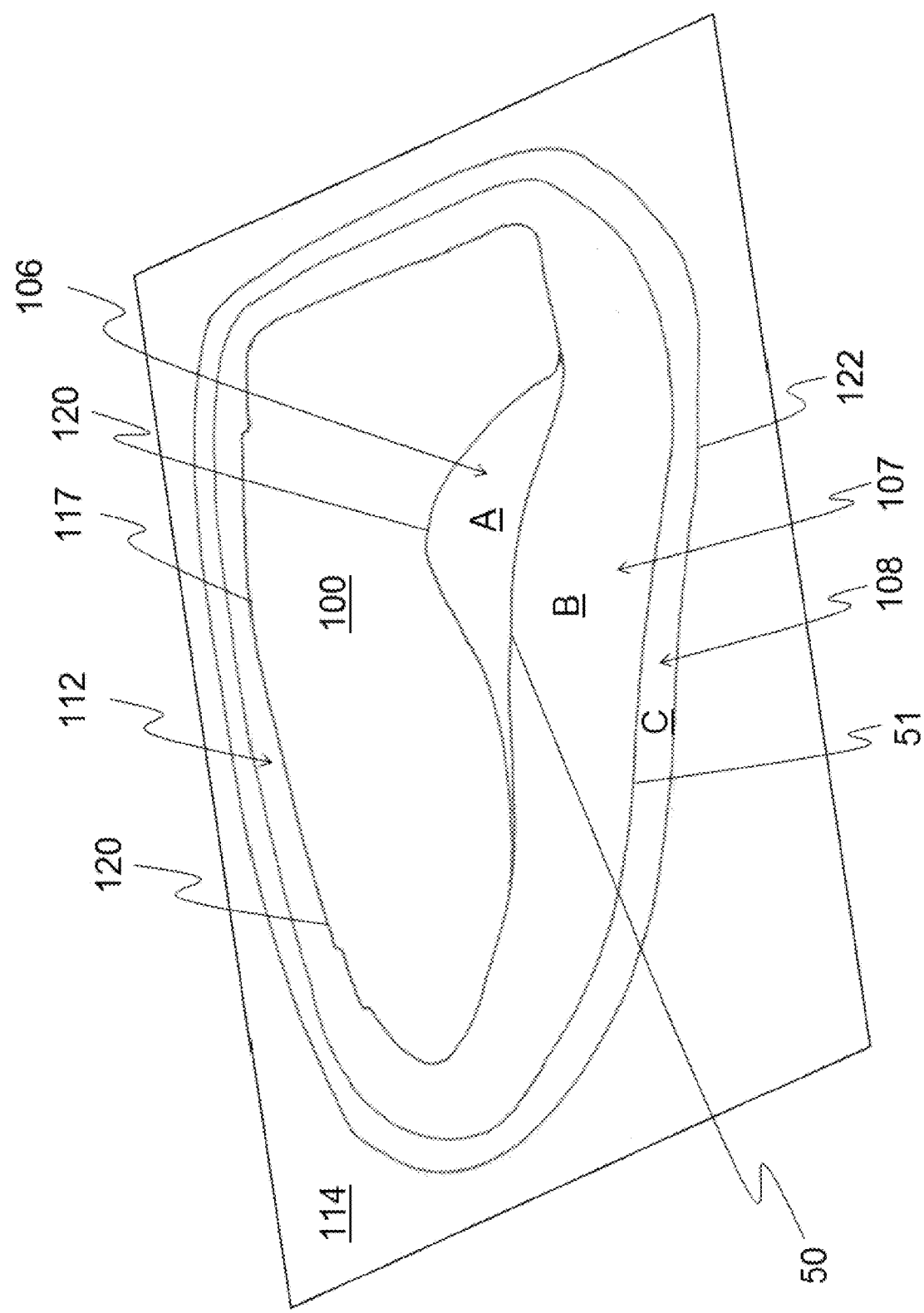

In contrast, in FIGS. 4A and 4B, the same component 100 is shown in which addendum 112 and binder 114 are determined using elevation curves (EC) lines, in accordance with the present invention. In this approach, it is beneficial to include additional EC lines, but typically, only one or two additional EC lines are required. The added EC lines are typically located between ECc 120 and ECb 122, but it is possible that the added EC lines can be added which meet with ECc or ECb. For example, the additional EC lines can be located so as to establish a die opening line (DOL), or a part opening line (POL), or can be placed on the addendum merely to provide additional addendum geometry control.

In FIGS. 4A and 4B, a first additional EC line (EC1) 50, and a second additional EC line (EC2) 51, are provided. It will be understood however, that additional EC lines (such as EC3, EC4 etc.) can also be added, if desired, or required.

Component 100 is shown with addendum 112, and a component edge line 117. Edge line 117 also acts as the first EC line, ECc 120, and for at least part of the component, EC1 50 overlaps with ECc 120. However, in those areas where additional control of the addendum geometry is desired, such as in concave area "A", EC1 50 is established by offsetting of the line ECc 120 outwards, using one of the techniques previously described.

For example, the line ECc 120, in area "A", is expanded (manually or automatically) outwardly (for the case of outside of part addendum) along a normal direction at ECc 120, with an offset distance. The offset amount preferably can include a part trim allowance, and the attached surface normal and curve tangents are calculated at each point at ECc 120 and transferred to an offset polyline which acts as a first approximation of EC1 50.

The direction of the expansion can be evaluated by a cross product of the curve tangent and the surface normal at ECc. The offset polyline approximating EC1 is again preferably further processed through any or all of the steps of removal of self intersections, smoothing, and concavity reduction, as previously described, in order to establish a final EC1 line 50. As a result, EC1 line 50 is offset from ECc 120 in the region of area A, but overlaps with ECc 120 in all other areas.

EC2 51 provides even further control of the addendum contour, and creates an additional addendum area "B". Using the techniques previously described, EC2 51 is produced from EC1 50, and provides additional geometry control over the addendum, in area B.

Further, once EC2 51 has been established, the procedure to establish a line ECb on the binder, namely ECb 122, is conducted by, for example, extension of the line EC2 51, using any of the previously described techniques, and again modifying line ECb 122 to adjust for self intersections, smoothing, concavity reduction and the like. This creates a further addendum area "C" between EC2 51 and ECb 122.

As a result, EC lines EC1 50, EC2 51 and ECb 122, can be determined, and can be used to establish areas A, B and C. The combination of these lines can then also be used to determine the various areas of addendum 112.

Further, using the technique of the present invention, the properties of EC1 50, EC2 51 and ECb 122 can be easily independently modified or otherwise controlled with respect to the design parameters including offset level, smoothness level, and/or concavity level. Again, the parameters for each line can be setup manually, semi-automatically, or automatically. From EC1 50, EC2 51 and ECb 122, the addendum surfaces A, B and C, can be determined as by filling in the spaces 106, 107 and 108, between ECc 120 and EC1 50, EC1 50 and EC2 51, and between EC2 51 and ECb 122, respectively, and by filling in the resultant spaces in areas A, B and C, with surfaces or mesh, as is discussed hereinbelow.

Other approaches can also be used to prepare the various EC lines. For example, in another approach, ECb line 122 is established using a different technique. In this case, ECb 122 can be established using incrementally built support surfaces, using incremental part extension, as follows.

Incremental part extension (IPE) is a technology developed for building support surfaces for any line construction. IPE is a fundamentally difficult problem in the prior art, because the extensions tend to result in cusps, overlaps, intersects, and can have other defects that will render the constructed surface unusable. In this embodiment however, these surfaces are built incrementally by layers which avoids many of the problems of the prior art technique.

In the present embodiment, the layer width at the current extension increment depends on the shape of boundary and extension surface quality reached at the previous increment. This allows building high quality extensions even in the case where the initial component boundary (ECc) is extremely ragged and twisted. Theoretically, if the component boundary does not have cracks, it is always possible to find a suitable size of increment of the extension width that provides a good solution for the extension layer. If the process of creating the extension layers is repeated a smooth transition surface is created from part boundary outwards, to the binder.

By way of example only, the following steps are performed for the IPE approach, namely: 1) a component line ECc 120 is first represented in a tessellated form as a polyline; 2) at each ECc boundary point on the polyline, a normal vector and tangent vector are computed; 3) for each point on the current boundary a new extension point is created in normal direction (in plan view); 4) line segments are created from the boundary to the extension points; 5) if line segments intersect in plan view, then they are removed and/or relocated through parameterization of the "intersection arc" on the boundary so that there are no intersected line segments. (It should be noted that using variable increments of the layer width it is always possible to eliminate the extension segments intersections); 6) from the 3D polyline extension a first approximation of a 3D polyline EC1 is created; and 7) the process of extending a layer is reiterated a number of times until the desired total size of the extension is reached, and the final EC1 line is determined.

The final step of the incremental extension consists in handling concavities on the extension boundary, and this is preferably done using known techniques, such as by enclosing the 3D polyline EC1 into a 2D convex hull in the plan view.

As before, the final addendum design can be optimized by making global or local edits of the design, by the following processes. For example, Global edits can be interactively performed that will adjust or control the shape of EC1 by setting the following global parameters (i.e. for the whole of EC1), namely:

Offset value (the minimum distance between ECc and EC1). Offset value could be setup in plan view, or 3D. Trim allowance can also be established as the default offset distance so as to account for trimming needs;

EC1 smoothness level that controls EC1 subdivision density used in the smoothing procedure. By default, EC1 smoothing is preferably performed on 3D spatial polyline;

EC1 convexity level that controls the global concavity. A global EC1 edit is used to optimize for draw depth, trim angles, formability, minimum material usage, along other criteria. The evaluation based on these criteria can be performed automatically or manually.

Additionally, or alternatively, interactively controlled local edits can also be performed to adjust or control the shape of EC1: If necessary, EC1 can be edited locally by dragging the EC1 curve to a new location. This type of editing can be done freely in 3D space, or in a constrained in plan view, or in a constrained side view.

For local editing, a segment on EC1 is selected for editing. The segment is shaped by dragging any point on the segment in a specific view, and accordingly the drag is constrained by that view's constraints. The shape of the segment is also controlled by segment tension, and the tension preferably controls or modifies the final length/shape of the segment.

In the preferred practice of the present invention, local EC line editing complements the global edit and is typically used to fine tune the shape of the EC lines in order to further optimize the design for draw depth, trim angles, formability, minimum material usage, transition between areas, along with other criteria.

The evaluation based on these criteria can be performed automatically by the computerized system according to specified design criteria, or can be done manually by the operator.

It should be noted that it is also possible to perform the various operations above to produce modified EC lines, and then repeat the operation to develop a further improved EC lines, using incremental EC line extension. This can be repeated as required to establish the final EC line.

As previously mentioned, once the final EC lines have been established, the surfaces between adjacent EC lines are constructed so as to provide an initial DieFace design, which preferably includes a design having the preferred continuity conditions at ECc, ECb, and any intervening or additional EC lines.

Different types of surfaces could be used, including NURBS, ruler surfaces, or the like. As a result, a punch face with its outer boundary as ECb is now ready for the next steps. It should be noted that when the component is formed totally over the punch face, the whole component including any unfolded flanges should preferably fit within the ECb 122 boundary.

For costing purposes or the like, this initial DieFace evaluation criteria can be used at this stage, and the user does not have to wait until the whole dieface is created in order to evaluate the punch face geometry, as opposed to prior art approaches.

Also, at this stage, the minimum draw depth can be established, and in particular, the position of the binder with respect to component is determined. The binder geometry generally reflects the component shape and the shape of the material over the punch face, up to the POL. The criteria for minimum draw depth, initial contact area as well as other dieface parameters can be evaluated at this stage. Compared to the prior art, a better binder can be more easily designed, since the binder depends not only on component geometry, but also on the punch shape up to ECb.

As a next stage, the technique of the present invention can also determine the DieFace Side Surface (DFSS), such as that surface at 108. In FIGS. 4A and 4B, this is the area between EC2 51, and ECb 122, and at least two methods can be used to create the DFSS. In a first approach, it should be noted that the determination of the DFSS is an intermediate step generally required for the dieface generation. DFSS (such as 108) is generated automatically as a draft surface (such as at an angle with respect to draw direction) that starts from EC2 and meets with the binder.

Once the DFSS is determined, ECb elevation curve 122 is determined by intersection of the DFSS with the binder 114. The shape of ECb 122 depends mostly on the shape of EC2 51 and the draft angle of the DFSS, in this case.

It should also be noted that the DFSS is either part of the final addendum, or it can be part of a support surface. The final addendum may or may not pass through these support surfaces. Moreover, it should also be noted that having established elevation lines ECc 120, EC1 50, EC2 51 and ECb 122, the technique of the present invention can create an addendum geometry which may or may not, pass through all of these elevation lines.

In general, various different techniques can be used for adjustment or modification of the final addendum design. This can include modification of the initial addendum design by modification of the addendum by filleting (e.g. by rounding, chamfering or the like) the addendum at ECc and ECb, with a fillet of constant or variable radius. For example, a fillet might be located between the Punch Face surface and DFSS at EC2 51, and between DFSS and the binder at ECb 122.

However, any or all of the following parameters can be used to adjust and/or control the overall final shape of the addendum, namely:

Punch fillet radius, which is the fillet radius between the Punch Face and DFSS;

Die fillet radius, which is the fillet radius between the DFSS and binder;

Draw depth; which is the distance between the binder and the component; and

Edge offset value, which is the offset distance between the Addendum outer trim line and the DOL.

Other design features might also be included in the final addendum design, as required or desired.

During editing, the generated addendum (excluding punch faces) can be transformed to subdivision surfaces for local shape editing. The shape of addendum 112 can also be changed by morphing (excluding punch faces) in order to create additional geometrical features controlling material flow. During addendum morphing the effect on draw depth, trim angles, among others can be dynamically evaluated.

From this data, the design of the die punch, and the blank holder, can be determined.

Another approach for calculation of the DFSS is to define ECb directly from EC2 51, in a manner similar to that used in Case 1. In this approach, the technique requires that EC2 51 be projected onto the binder along the drawing direction to create an initial approximation of ECb. This initial value is offset outwardly on the binder, along the expansion direction, for a selected distance. As with previous approaches, the offset ECb is modified to remove self-intersects, overlaps, and the like, smoothed, and any concavities are reduced or eliminated, to establish a final ECb, and thus determine a DFSS. Once the DFSS has been established, the addendum design can be finalized, as previously described.

Other methods for DFSS calculation can be used, and again, ECb can be further modified using global or local adjustments.

Case 3

The present invention can also be used to determine an addendum geometry in those designs wherein additional addendum geometry features are required. For example, frequently an addendum "sausage" consisting of a peak and valley, is added to the addendum in order to control the draw of the punch during the drawing operation.

Figure 5A:
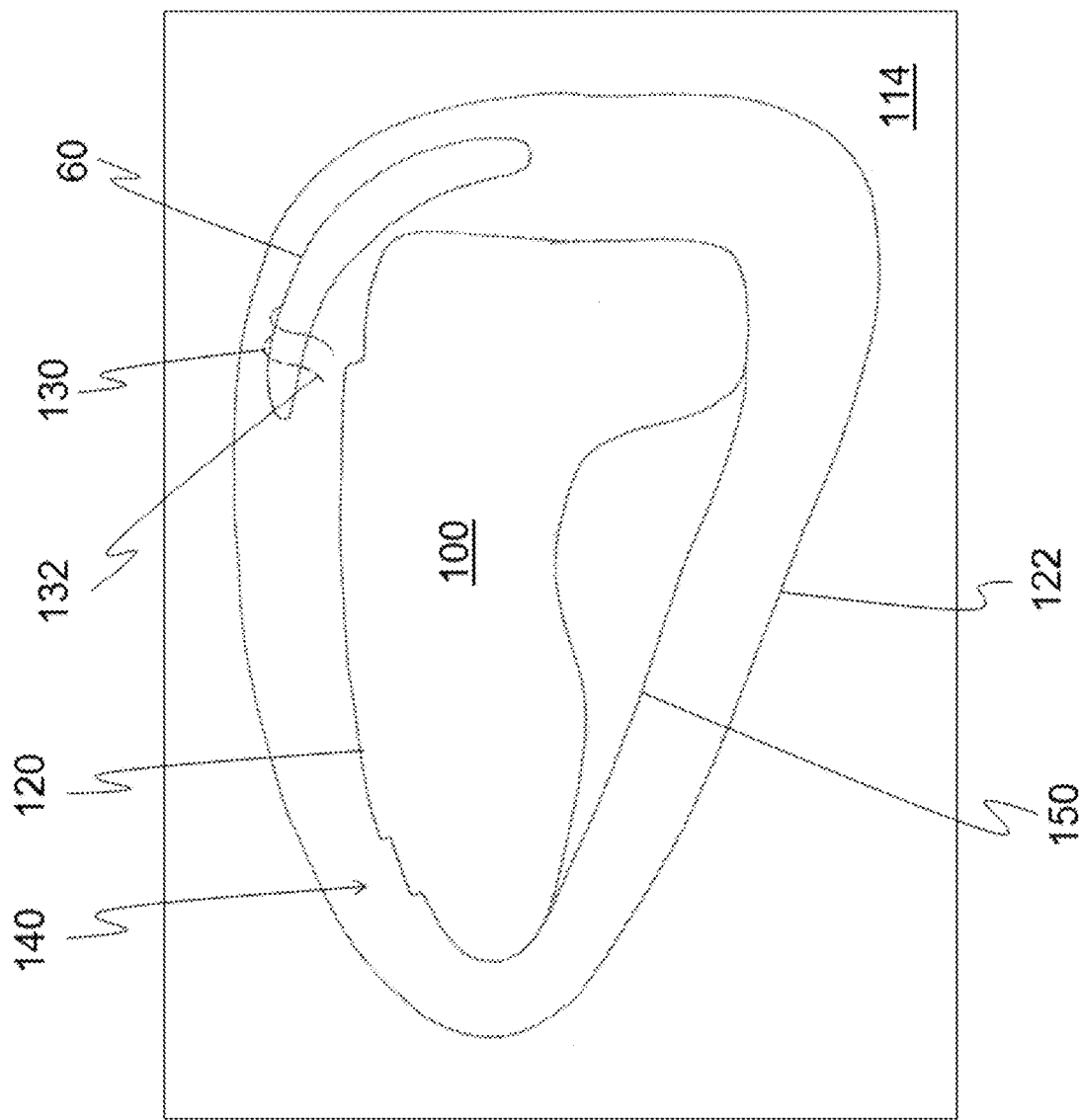
Figure 5B:
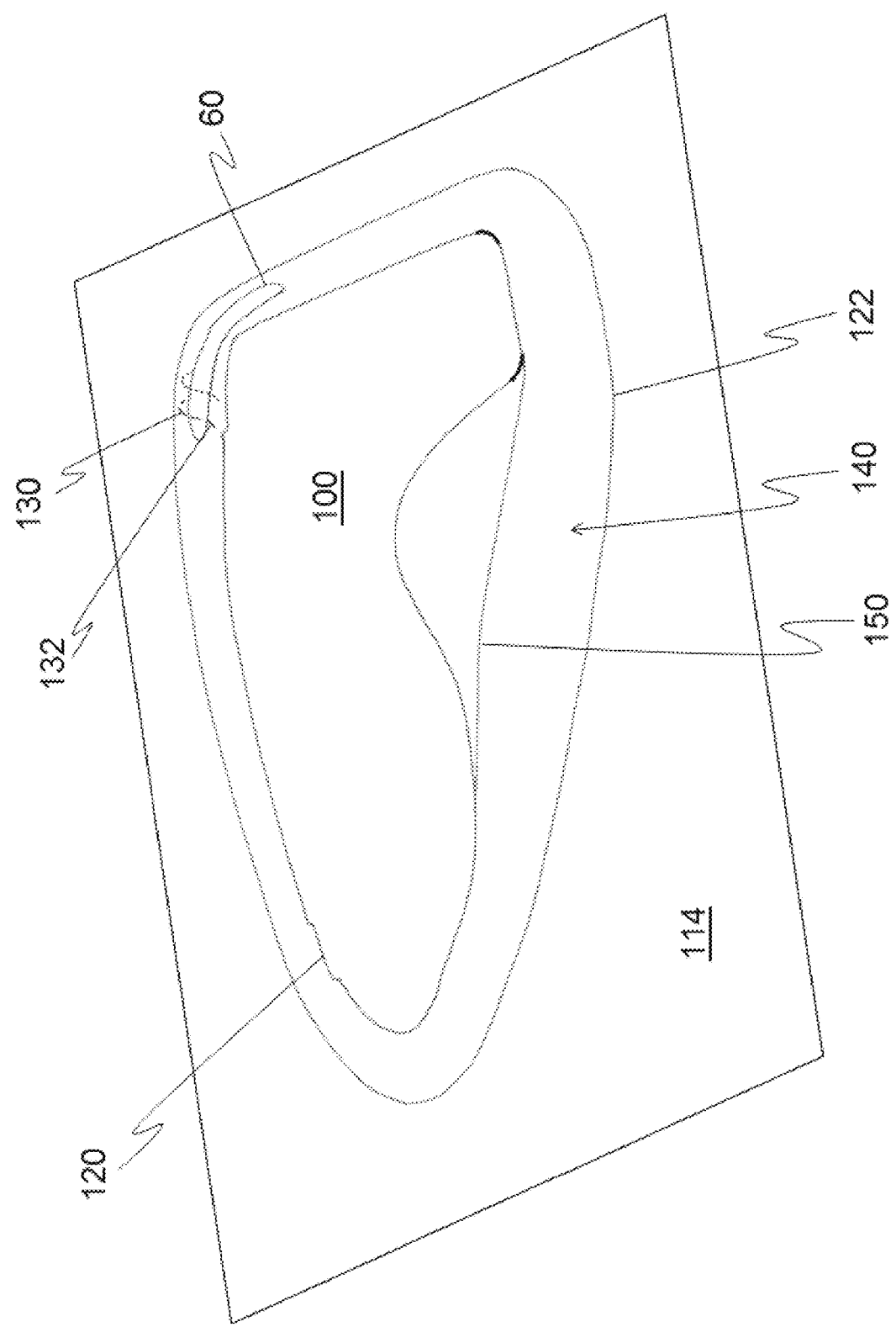

In this approach, as seen in the plan view of FIG. 5A and the perspective view of FIG. 5B, an EC line (termed as "ECs") 60, is added which corresponds to the position of a design sausage. It is to be noted that ECs 60 does not encircle component 100, but is only positioned adjacent to a selected part of component 100.

As before, ECc 120 corresponds to the component boundary, and EC1 150 and ECb 122, can be established using essentially the same techniques as described hereinabove. For clarity, EC2 has been omitted, but it is clear that this elevation line might also be included in the addendum design of this approach.

However, in this example, in order to provide local control of addendum conditions, a sausage feature has been created, and this sausage feature can be used to provide local control of the continuity conditions at ECs, and thus control the addendum geometry in this area of component 100. The size and shape of the sausage feature, and line ECs 60, is adjusted so as to provide a sausage feature having a peak 130 and valley 132. The size and shape of peak 130 and valley 132 can be adjusted as required to enhance the addendum design geometry in this area.

Addendum 140 connecting ECc 120, ECb 122, EC1 150, and ECs 60, and meeting the C0, C1 or C2 continuity conditions at the various elevation curves, can be automatically created and optimized using these elevation curve lines. Again, ECc 120 continuity conditions are preferably inherited from component 100, while the continuity conditions at ECb 122 are typically inherited from binder 114.

In the simulation of the drawing operation, the effect of the sausage feature on the component parameters can be evaluated, in order to modify or otherwise adjust the sausage line ECs 60. ECs 60 can also be is created, modified or adjusted, by different approaches, however.

Case 4

In a further feature, the approach of the present invention can also be used to design an addendum wherein at least part of the component is positioned on the binder. This approach is shown in plan view in FIG. 6A and a perspective view in FIG. 6B.

For this design, which is similar to the design shown in FIGS. 4A and 4B, ECc 72 coincides with the component boundary line 77 for a component 70. ECb 75 is established at the binder edge, using any of the previously described techniques. Line EC1 71, is again also present to address the concavity of part 70. In this example, however, a section 76 of component 70, remains as part of, and is located on, binder 78. Component section 79 is also established on what would otherwise be the addendum.

In order to address this situation, a further EC line, namely EC3 73, is created on binder 78. EC3 73 modifies the usual ECb line 75 in the area of section 76.

Figure 6A:
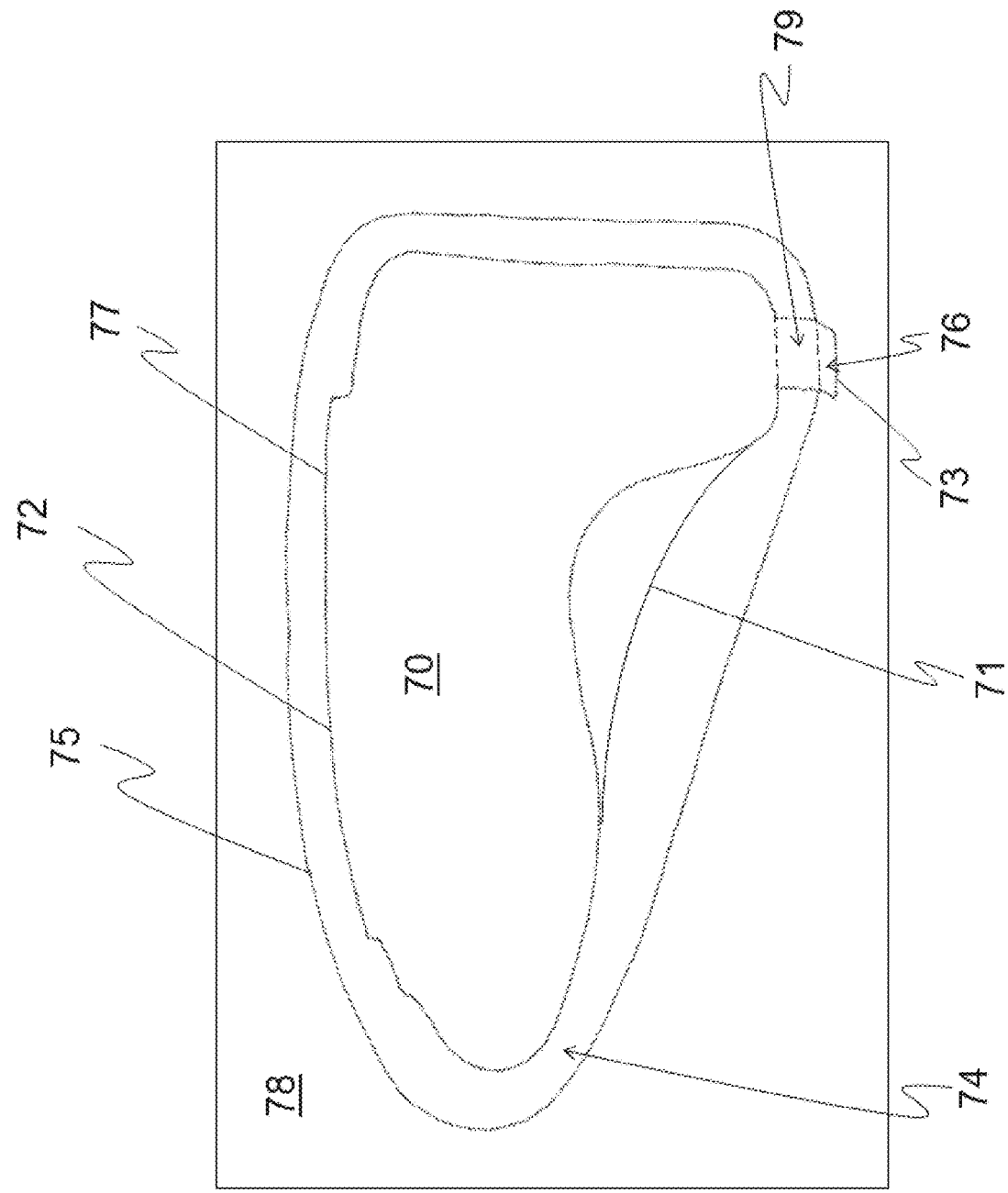
FIGS. 6A and 6B are plan and perspective views of addendum design for a component wherein part of the component is on the binder.
Figure 6B:
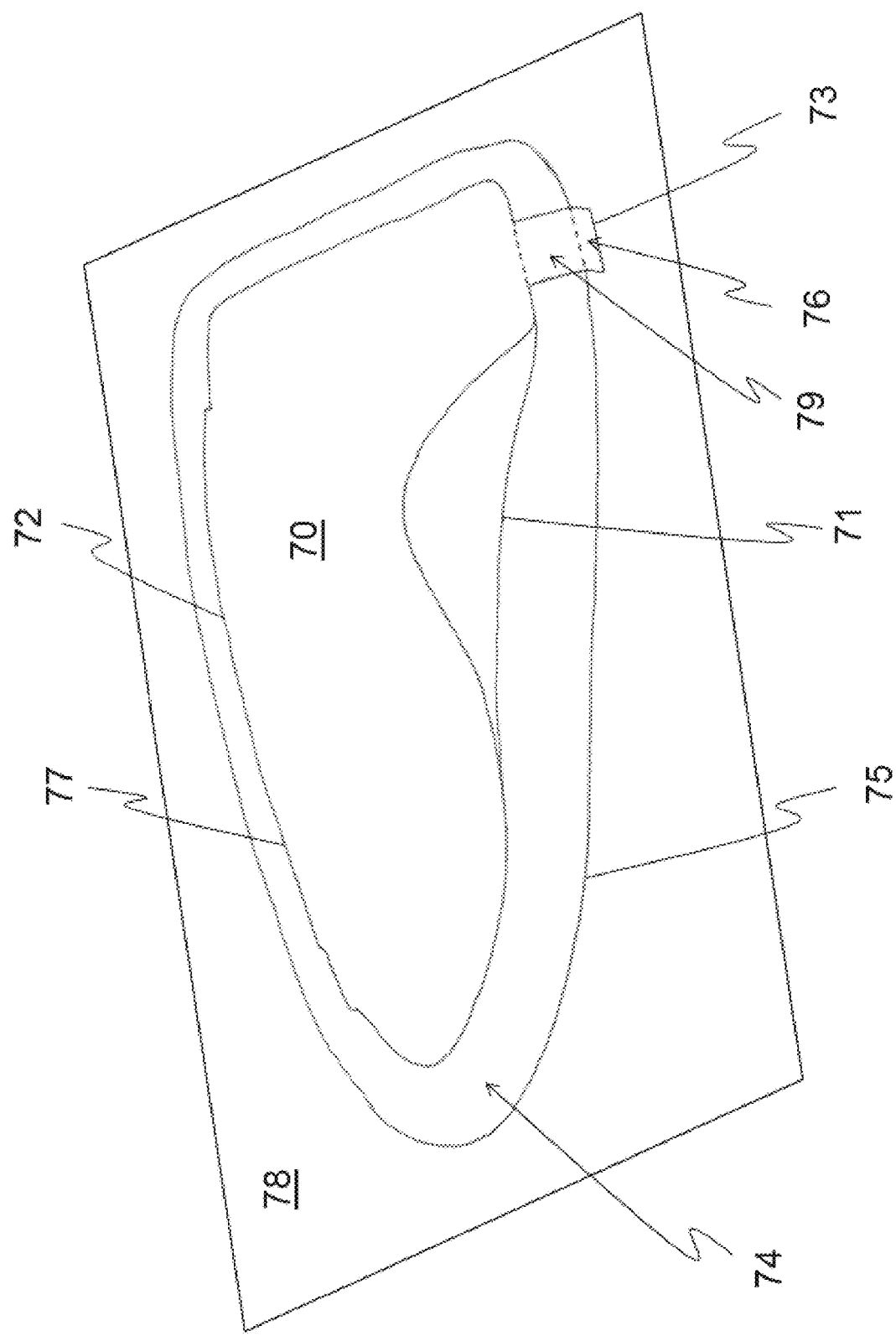

In FIGS. 6A and 6B, EC3 73 is derived from the Component Edge normal Projection on the Binder (CEPB), and can, if desired, be made larger by an amount reflecting the smoothing of the CEPB boundary, the draw depth, the tooling clearances, the wall angles, the type of addendum, and the type of material, among other parameters.

An addendum 74 connecting ECc 72, EC1 71, ECb 75, and EC3 73 and meeting the C0, C1 or C2 continuity conditions at ECc 72, ECb 75, EC1 71 and EC3 73, is automatically created, according to the previously described techniques. Again, ECc continuity conditions may be inherited from component 70, while EC3 and ECb continuity conditions are typically inherited from the binder.

Other Cases

The technique of the present invention is also applicable for design of internal addendums, such as for openings in the internal sections of a component. While the previous discussions have been related to situations where the addendum is located outside of the component, the technique of the present invention is equally applicable in situations where an internal addendum, inside of the component is necessary.

Figure 7A:
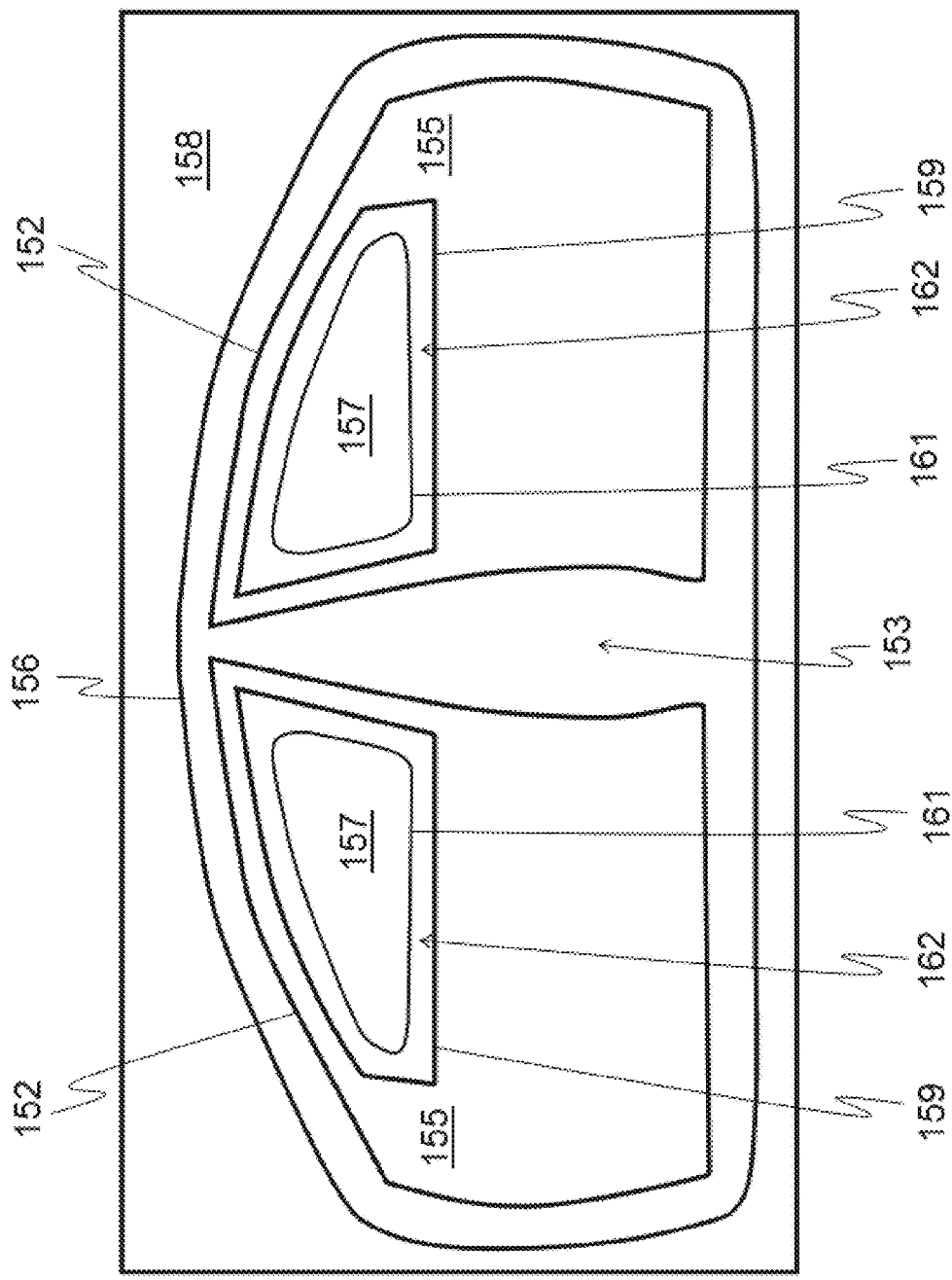
FIGS. 7A and 7B are plan views of components having internal addendums.

For example, in FIG. 7A a design is shown having two automotive doors 155 as the components, which doors are formed in a single drawing operation from a single blank. As such, the resultant addendum is used to connect multiple components in a shared or common addendum design. In this example, each of doors 155 defines a component EC line 152 as ECc, and a single ECb line 156 is established on binder 158. The area 153 between the two ECc 152 lines, and ECb line 156 defines a first addendum 153.

Windows 157 in doors 155 additionally establish an internal area, and as such, a second, internal addendum 162, is formed in window section 157. In this case, window component line 159 acts as an internal ECc' line, and from ECc' line 159, an internal ECb' line 161 can be determined according to the techniques previously described. Internal addendum 162 can be determined for the area between internal ECc' line 159, and internal ECb' line 161, using the techniques previously described. ECb' line 161, inside of addendum 162, may or may not lie on binder 158.

Figure 7B:
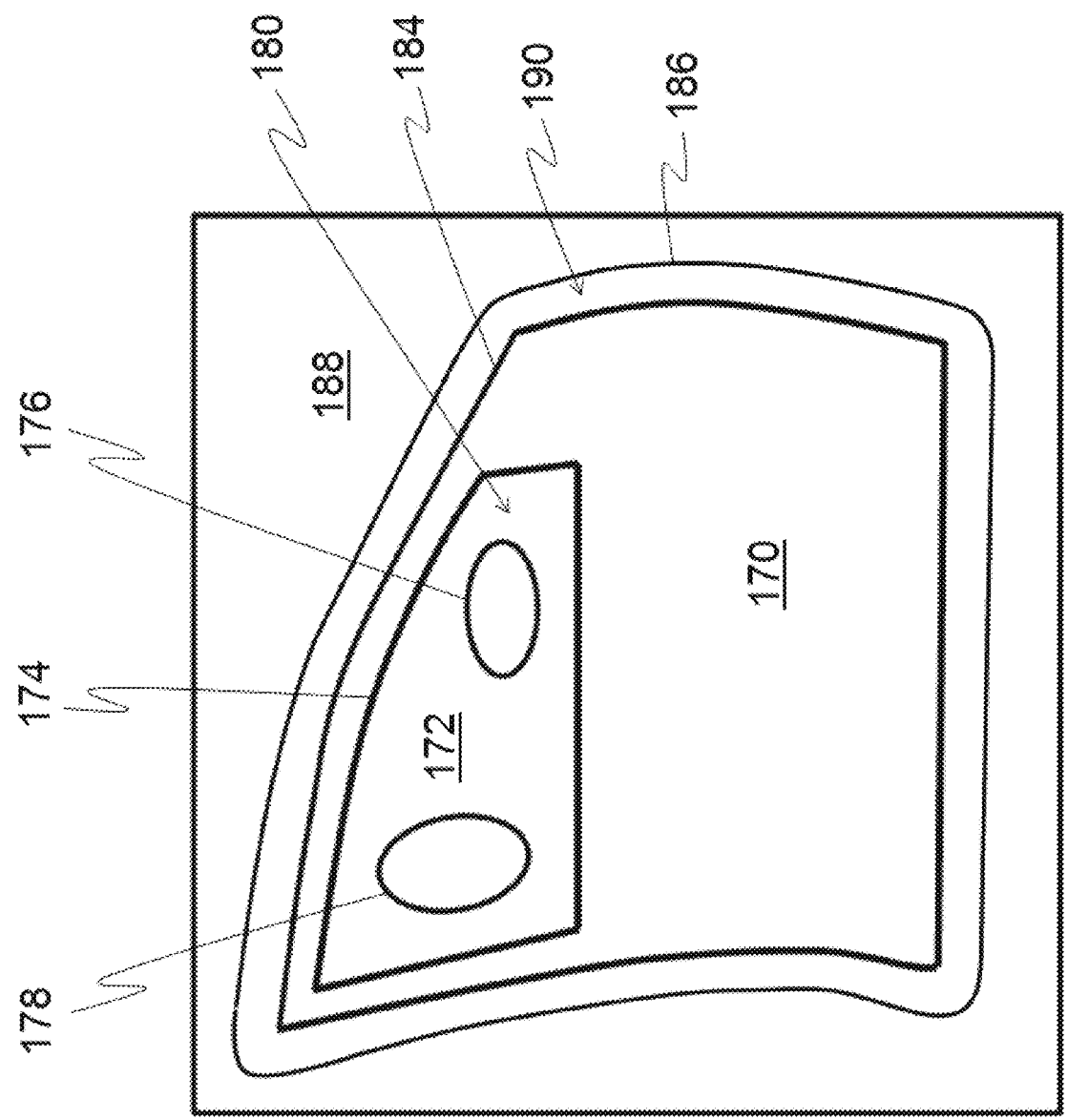

In FIG. 7B, a design is shown having a single door 170 with a window section 172 defined by line 174. ECc 184 is defined by the outside of the door design, and ECb 186 is defined on binder 188. As a result, outside addendum 190 can be determined.

Line 174 however, also acts as an internal ECc' line. In this example, multiple internal EC lines, namely EC5 176 and EC6 178 can be added to create an addendum 180 within window 172, and thus control the addendum geometry inside of line 174. The area inside of EC5 and EC6 may or may not lie on binder 188.

Figure 8:
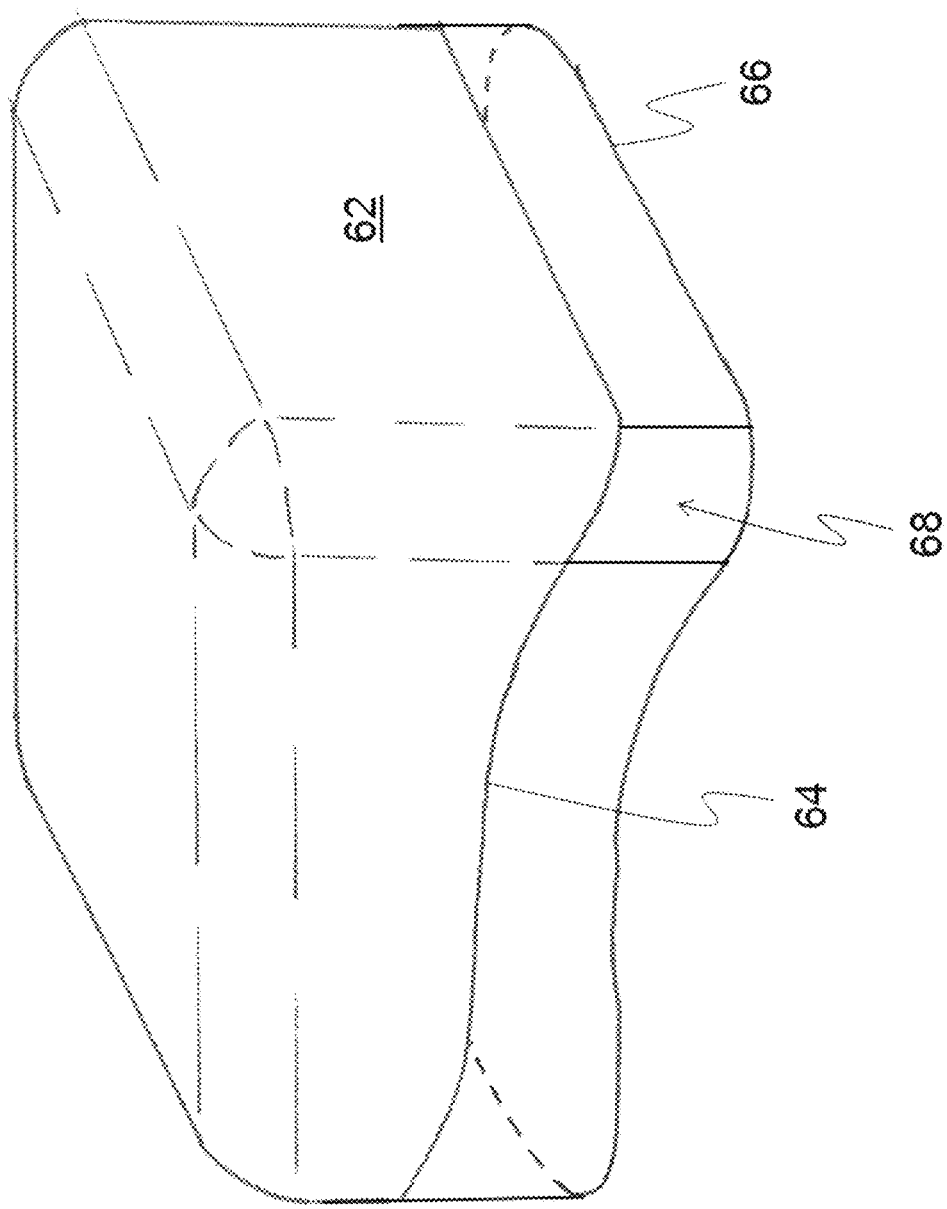
FIG. 8 is a perspective view of an addendum design, wherein no binder is required.

The technique of the present invention can be also be used in other applications. For example, the technique can be applied to a drawing process that does not include a binder. As seen in FIG. 8, a component 62 is shown in perspective view which does not require a binder. In this option, an elevation curve is established at the component boundary, and is again called ECc 64. A second (distal) EC line, named EC4 66, is established to create an addendum 68 between lines ECc 64 and EC4 66. As for the previous examples, the continuity conditions for addendum surfaces at ECc 64 and at EC4 66 are used to establish the shape of the addendum.

In this example, no binder is required since lines ECc 64 and EC4 66 outline the shape of the part to be drawn, without the need for a binder section.

Figure 9A:
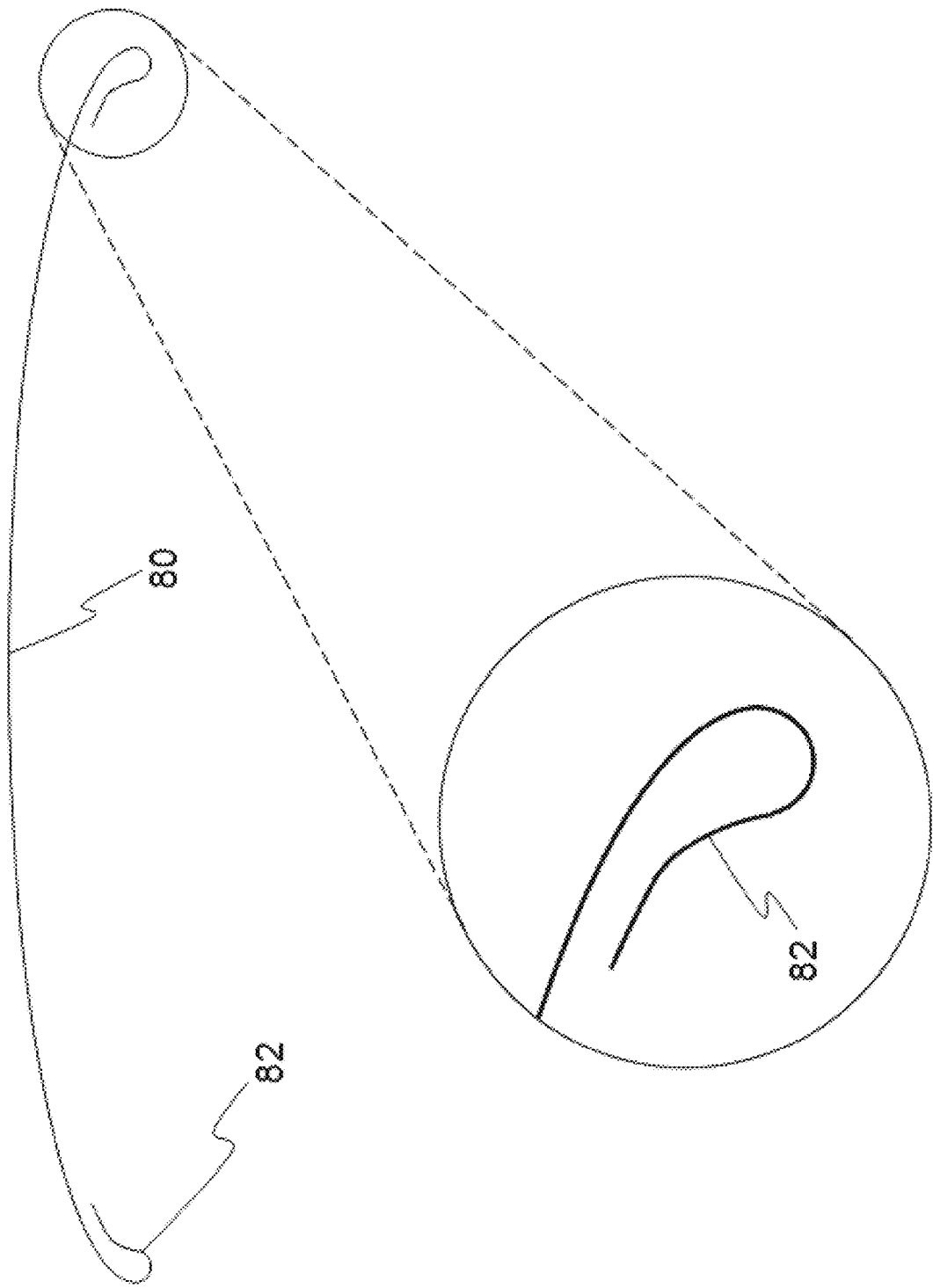
FIGS. 9A and 9B are side views of a component having a folded edge design.
Figure 9B:
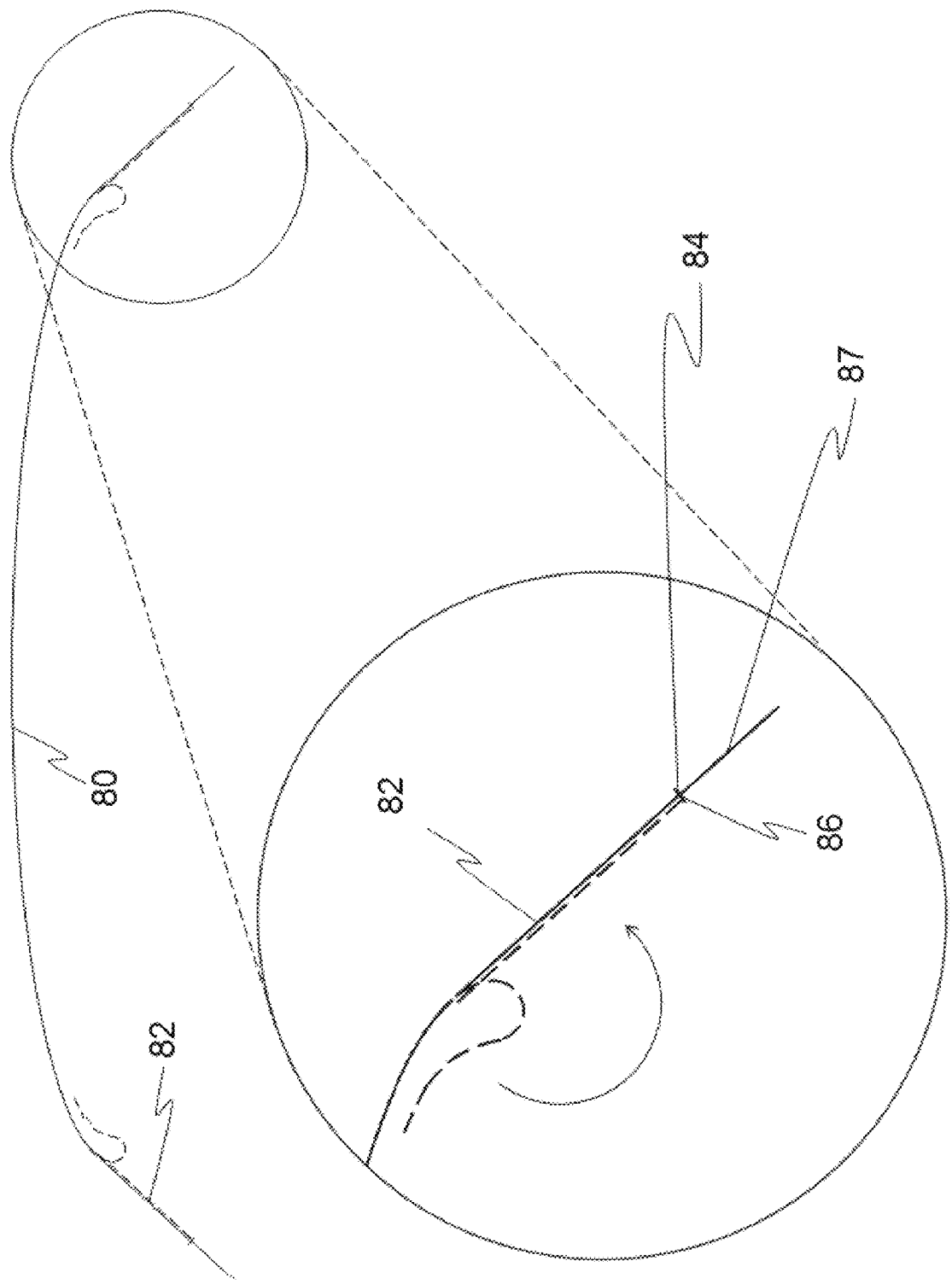

In a further case, shown in FIGS. 9A and 9B, a component 80 is shown in a cross-section side view. From FIG. 9A, it can be seen that component 80 includes a flange 82 which is intended to be folded under the edges of component 80. Enlarged views of the area near flange 82 are also provided.

In this example, for determination of the addendum geometry, the folded flange sections 82 are "unfolded", in the direction of the arrow, as shown in FIG. 9B, in order to establish a trim line 84. Once trim line 84 has been established, ECc 86 is established at trim line 84. Using this ECc line 86, the design of the addendum 87 (shown in part) is done as previously described using trim line 84 as the ECc line.

Figure 10:
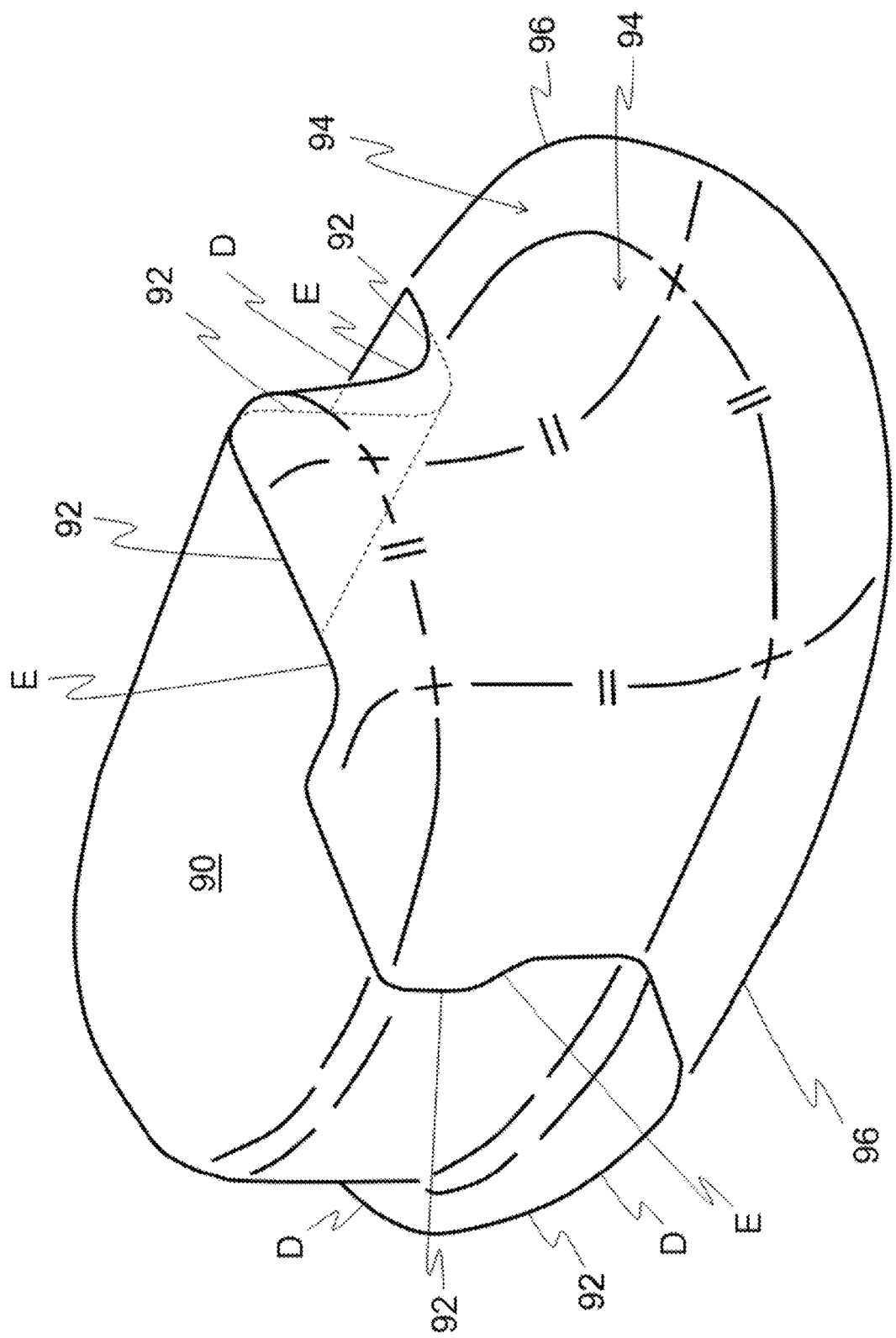
FIG. 10 is a perspective view of a component wherein only a partial addendum is required.

In FIG. 10, a further option is shown wherein component 90 includes an ECc line 92, and wherein only a partial addendum 94 is required. In this case, an ECb line 96 is established so as to overlap with ECc line 92 in those areas "D" where an addendum is not required. In the area "E" where addendum 94 is required, the process for establishing ECb line 96, and addendum 94, from lines ECc 92 and ECb 96 is the same as those approaches previously described.

Figure 11:
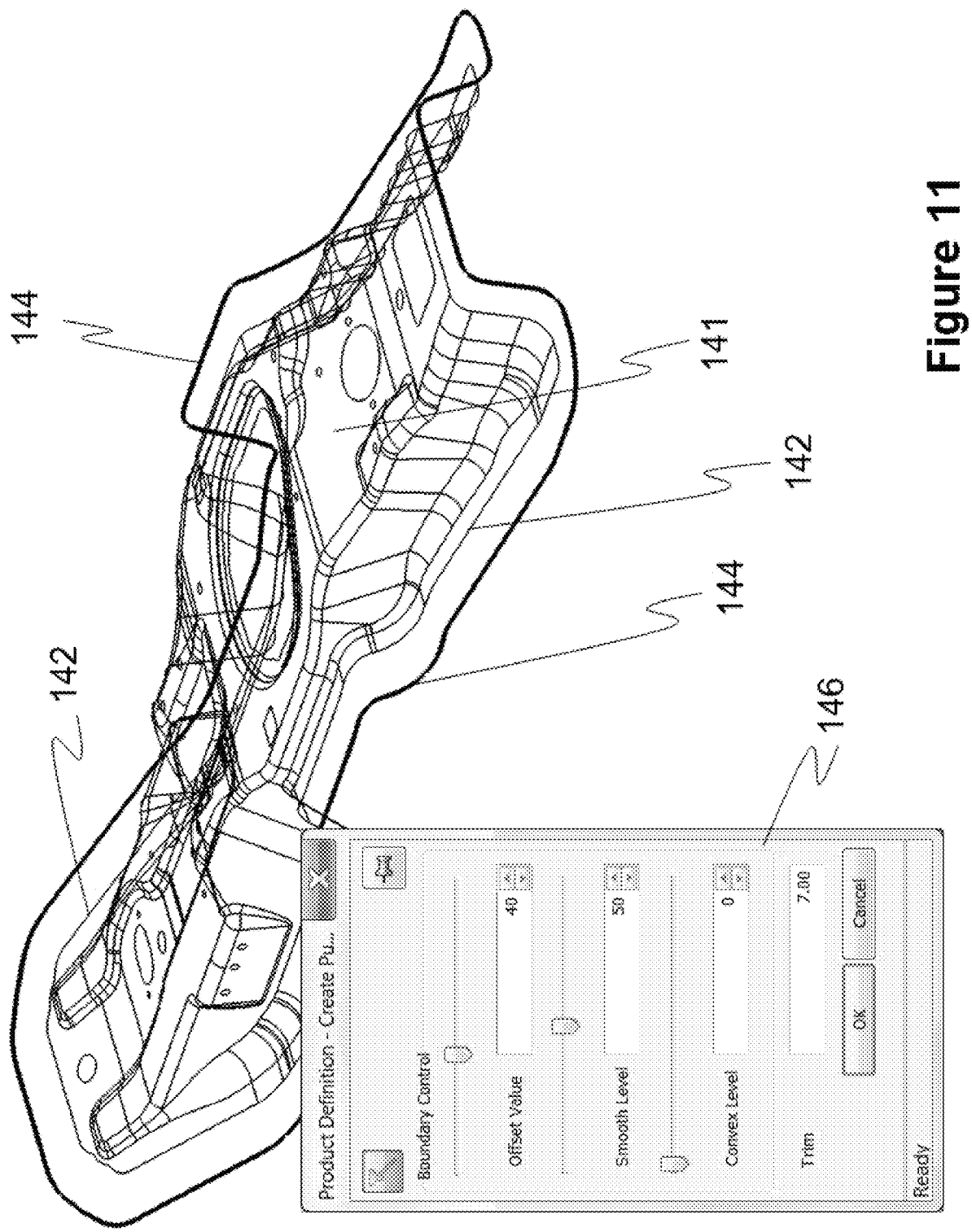
FIG. 11 is a simulated computer screen shot of a component design, which includes a slider control feature.

The process of the present invention is particularly well suited for applications in a computerized environment. In FIG. 11, a simulated screen shot of a computerized design for a component 141 is shown in which ECc 142 is established at the component edge, and a further EC line 144 is established at a selected offset distance from ECc 142.

A computer screen control system 146 is shown in which the user can adjust the properties of EC line 144 by adjusting values such as concavity, trim allowance, offset, and the like in order to adjust the location of EC line 144. This can be done on a global or local arrangement. In the example shown, control system 146 provides a means to input values for offset, smoothness and concavity. This can be done on a global or local level.

Additionally, the user can merely "grab" EC line 144, on screen, in order to move it to adjust for global or local changes, or the like. As such, the user can easily adjust the properties of any EC line. This can include adjusting the properties of any other EC lines, including ECb, EC1, EC2, EC3, ECs, or the like, as previously described. From these EC lines, the addendum can be rapidly and easily established.

This affords the user significant advantages in that the EC lines can be easily and rapidly modified and adjusted.

Thus, it is apparent that there has been provided, in accordance with the present invention, an addendum design method and apparatus, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

What is claimed is:

1. A computerized method for the design of an addendum by a computerized device, wherein all or part of the addendum is designed in a sectionless approach, comprising: inputting a component design into said computerized device for a component having a component geometry; establishing a plurality of at least two elevation curve (EC) lines to establish at least a first EC line and a distal EC line, wherein said first EC line is related to, or fully or partially established on said component design, and said distal EC line is fully or partially separated from said first EC line so as to establish a space between said first and said distal EC lines; and filling the space between said first and distal EC lines so as to define said addendum having an addendum geometry designed to permit formation of said component geometry during manufacturing of said component; wherein design of said addendum is controlled by establishing continuity conditions at any or all EC lines, and interconnection of the spaces between any or all EC lines is accomplished using a surface based or mesh based parameterized filling technique, and wherein
   said distal EC line, or any additional EC lines, is established from said first EC line or another EC line using;
   (i) a process which comprises determination of an incremental part extension (IPE) comprising:
   representing any of said first EC line, or subsequently any other EC line in a tessellated form as a 3D polyline;
   at each boundary point on the 3D polyline, establishing a normal vector and a tangent vector;
   projecting an extension from each point on the current boundary, using said normal and tangent vectors, so as to create a collection of new extension points;
   connecting said new extension points so as to create a new 3D polyline, separated from the previous 3D polyline extension, on the extension points; and
   repeating the above steps of extending a layer until a desired total size for the extension is achieved, and said projected extensions produce said distal EC line; or
   (ii) a process which comprises determination of the DieFace Side Surface (DFSS) from said first EC line comprising:
   (a) projecting a projection of said first EC line, offsetting said projection to prepare a first approximation of a further EC line, and filling the surface between the first EC line and said further EC line with a draft surface between said EC line and said first approximation of said further EC line; or
   (b) projecting a draft surface at an angle that starts from said first EC line in order to produce a first approximation of a further EC line;
   and repeating steps (a) or (b) with said further EC line until said distal EC line is produced,
   and
   wherein said first EC line is fully established on said component design as ECc, and when present, any additional EC lines are fully or partially positioned between ECc and said distal EC line, when viewed in plan view, in the drawing direction.

2. The computerized method as claimed in claim 1 wherein additional EC lines are provided between said first and said distal EC lines, and a plurality of spaces are provided between any or all adjacent EC lines, wherein the total number of EC lines is between 2 and 5.

3. The computerized method as claimed in claim 1 wherein said addendum is controlled by establishing surface or mesh continuity conditions at any or all of said elevation curve lines, and interconnection of the spaces between elevation curves is modified by a filleting technique.

4. The computerized method as claimed in claim 1 wherein the addendum design is parameterized by tension, smoothness, concavity, continuity, curvature, radii, draw depth, draft angle, clearances, minimizing the addendum area, or minimizing the energy required for addendum deformation, or wherein the final shape of the addendum is manually, semi-automatically or automatically modified in accordance with design parameters, which design parameters are selected from the group consisting of tension, smoothness, concavity, continuity, curvature, radii, draw depth, draft angle, clearances, minimizing addendum area, and minimizing the energy required for addendum deformation.

5. The computerized method as claimed in claim 1 wherein said addendum is an internal addendum, or an external addendum, or wherein said method comprises both internal and external addendums.

6. The computerized method as claimed in claim 1 wherein said addendum is used to connect multiple components.

7. The computerized method for the design of an addendum, as claimed in claim 1, wherein additionally, at least one space between EC lines is established by using an offset approach.

8. The computerized method as claimed in claim 7 wherein said offset approach is determined using an approach selected from the group consisting of offset distance, offset angle, continuity conditions at EC lines, forming radii, clearances, draw depth, minimum blank requirements, and forming severity.

9. The computerized method as claimed in claim 8 wherein said distal EC line is modified to account for design parameters selected from the group consisting of draw depth, tooling clearances, trim line allowances, wall angles, the type of addendum, the expected forming severity, the type of material, self intersections, line smoothing and the removal or reduction of concavities, and wherein said distal EC line is automatically, semi-automatically or manually modified to account for offset level; smoothness level; and concavity level.

10. The computerized method as claimed in claim 1 wherein said addendum design utilizes said IPE process, and wherein said projected extensions are modified so as to remove any intersections with adjacent projected extensions.

11. The computerized method as claimed in claim 1, wherein said addendum design utilizes said DieFace Side Surface (DFSS) process, and wherein said draft surface is filleted at said EC line, and/or wherein said further EC line or said draft surface are smoothed or modified to remove self-intersects or overlaps, or any concavities are reduced or eliminated.

12. The computerized method as claimed in claim 1, wherein said component geometry of said component design has a first geometric shape corresponding to a physical part to be manufactured, and said addendum geometry of said addendum has a second geometric shape different from said first geometric shape.

13. The computerized method according to claim 1, wherein said method includes the step of providing a computerized device having a processor and a storage medium having a non-transitory computer-readable medium, said method being performed by said processor wherein said inputting of said component design includes the step of storing said component design on said storage medium wherein said component design has a first geometric shape defined by said component geometry corresponding to a physical part, and said addendum is defined by said method and stored on said storage medium wherein said addendum has a third geometric shape defined by said addendum geometry different from said first geometric shapes.

14. The computerized method according to claim 13 wherein said addendum is stored in a format which is exportable to another computerized device and usable in the manufacture of said physical part.

15. A computerized method for the design of an addendum by a computerized device, wherein all or part of the addendum is designed in a sectionless approach, comprising: inputting a component design into said computerized device for a component having a component geometry; establishing a plurality of at least two elevation curve (EC) lines to establish at least a first EC line and a distal EC line, wherein said first EC line is related to, or fully or partially established on said component design, and said distal EC line is fully or partially separated from said first EC line so as to establish a space between said first and said distal EC lines; and filling the space between said first and distal EC lines so as to define said addendum having an addendum geometry designed to permit formation of said component geometry during manufacturing of said component; wherein design of said addendum is controlled by establishing continuity conditions at any or all EC lines, and interconnection of the spaces between any or all EC lines is accomplished using a surface based or mesh based parameterized filling technique, and wherein said distal EC line, or any additional EC lines, is established from said first EC line or another EC line using;

(i) a process which comprises determination of an incremental part extension (IPE) comprising:
 representing any of said first EC line, or subsequently any other EC line in a tessellated form as a 3D polyline;
 at each boundary point on the 3D polyline, establishing a normal vector and a tangent vector;
 projecting an extension from each point on the current boundary, using said normal and tangent vectors, so as to create a collection of new extension points;
 connecting said new extension points so as to create a new 3D polyline, separated from the previous 3D polyline extension, on the extension points; and
 repeating the above steps of extending a layer until a desired total size for the extension is achieved, and said projected extensions produce said distal EC line; or (ii) a process which comprises determination of the DieFace Side Surface (DFSS) from said first EC line comprising:
 (a) projecting a projection of said first EC line, offsetting said projection to prepare a first approximation of a further EC line, and filling the surface between the first EC line and said further EC line with a draft surface between said EC line and said first approximation of said further EC line; or
 (b) projecting a draft surface at an angle that starts from said first EC line in order to produce a first approximation of a further EC line;
and repeating steps (a) or (b) with said further EC line until said distal EC line is produced,
and
wherein said first EC line is fully established on said component design as ECc, and when present, any additional EC lines are fully or partially positioned between ECc and said distal EC line, when viewed in plan view, in the drawing direction; and
wherein said spaces between any EC lines are filled with surfaces or meshes, and the continuity conditions at said first EC line are inherited from said component, and
wherein said surfaces or meshes have C2 continuity at said first and said distal EC lines.

16. A computerized method for the design of an addendum by a computerized device, wherein all or part of the addendum is designed in a sectionless approach, comprising: inputting a component design into said computerized device for a component having a component geometry; establishing a plurality of at least two elevation curve (EC) lines to establish at least a first EC line and a distal EC line, wherein said first EC line is related to, or fully or partially established on said component design, and said distal EC line is fully or partially separated from said first EC line so as to establish a space between said first and said distal EC lines; and filling the space between said first and distal EC lines so as to define said addendum having an addendum geometry designed to permit formation of said component geometry during manufacturing of said component; wherein design of said addendum is controlled by establishing continuity conditions at any or all EC lines, and interconnection of the spaces between any or all EC lines is accomplished using a surface based or mesh based parameterized filling technique, and wherein said distal EC line, or any additional EC lines, is established from said first EC line or another EC line using;
- (i) a process which comprises determination of an incremental part extension (IPE) comprising:
  - representing any of said first EC line, or subsequently any other EC line in a tessellated form as a 3D polyline;
  - at each boundary point on the 3D polyline, establishing a normal vector and a tangent vector;
  - projecting an extension from each point on the current boundary, using said normal and tangent vectors, so as to create a collection of new extension points;
  - connecting said new extension points so as to create a new 3D polyline, separated from the previous 3D polyline extension, on the extension points; and
  - repeating the above steps of extending a layer until a desired total size for the extension is achieved, and said projected extensions produce said distal EC line; or
- (ii) a process which comprises determination of the DieFace Side Surface (DFSS) from said first EC line comprising:
  - (a) projecting a projection of said first EC line, offsetting said projection to prepare a first approximation of a further EC line, and filling the surface between the first EC line and said further EC line with a draft surface between said EC line and said first approximation of said further EC line; or
  - (b) projecting a draft surface at an angle that starts from said first EC line in order to produce a first approximation of a further EC line;

and repeating steps (a) or (b) with said further EC line until said distal EC line is produced, and wherein additionally, at least one space between EC lines is established by using an offset approach and said offset approach is determined using an approach selected from the group consisting of offset distance, offset angle, continuity conditions at EC lines, forming radii, clearances, draw depth, minimum blank requirements, and forming severity; and additionally comprising:

inputting a component design to establish a component boundary line;

establishing said component boundary line as a first EC line;
- either: i) making a normal projection, in plan view, of said component boundary line and offsetting said normal projection of said component boundary line by a set distance so as to create a first approximation of said distal EC line, separated from said first EC line; or
  - ii) projecting an angled projection from said first EC line, at an angle α, which is between 0.5 and 10 degrees, so as to create a first approximation of said distal EC line, separated from said first EC line; and modifying said first approximation of said distal EC line so as to smooth said distal EC line, and thereby prepare a final distal EC line.

17. The computerized method as claimed in claim 16 wherein said distal EC line is modified to account for design parameters selected from the group consisting of draw depth, tooling clearances, trim line allowances, wall angles, the type of addendum, the expected forming severity, the type of material, self intersections, line smoothing and the removal or reduction of concavities, and wherein said distal EC line is automatically, semi-automatically or manually modified to account for offset level; smoothness level; and concavity level.

18. A non-transitory computer readable medium containing a program, said program being configured to make a computer execute the steps of a method for designing a tool design of a tool for drawing of sheet metal to form a sheet metal component having a predefined component geometry, wherein said tool comprises a die, and a punch, and wherein
  said tool design comprises at least one addendum surrounding all or part of said sheet metal component, and is generated by a method comprising:
  inputting a component design for said sheet metal component for processing by said program so as to prepare said predefined component geometry;
  generating an addendum design using an addendum design method wherein all or part of the addendum is designed in a sectionless approach, comprising: establishing a plurality of at least two elevation curve (EC) lines to establish at least a first EC line and a distal EC line, wherein said first EC line is related to, or fully or partially established on said component design, and said distal EC line is fully or partially separated from said first EC line so as to establish a space between said first and said distal EC lines; and filling the space between said first and distal EC lines so as to define said addendum having an addendum geometry designed to permit formation of said predefined component geometry during manufacturing of said sheet metal component; wherein design of said addendum is controlled by establishing continuity conditions at any or all EC lines, and interconnection of the spaces between any or all EC lines is accomplished using a surface based or mesh based parameterized filling technique, and wherein said distal EC line, or any additional EC lines, is established from said first EC line or another EC line using;
- (i) a process which comprises determination of an incremental part extension (IPE) comprising:
  - representing any of said first EC line, or subsequently any other EC line in a tessellated form as a 3D polyline;
  - at each boundary point on the 3D polyline, establishing a normal vector and a tangent vector;
  - projecting an extension from each point on the current boundary, using said normal and tangent vectors, so as to create a collection of new extension points;
  - connecting said new extension points so as to create a new 3D polyline, separated from the previous 3D polyline extension, on the extension points; and
  - repeating the above steps of extending a layer until a desired total size for the extension is achieved, and said projected extensions produce said distal EC line; or
- (ii) a process which comprises determination of the DieFace Side Surface (DFSS) from said first EC line comprising:
  - (a) projecting a projection of said first EC line, offsetting said projection to prepare a first approximation of a further EC line, and filling the surface between the first EC line and said further EC line with a draft surface between said EC line and said first approximation of said further EC line; or (b) projecting a draft surface at an angle that starts from said first EC line in order to produce a first approximation of a further EC line;

and repeating steps (a) or (b) with said further EC line until said distal EC line is produced, and wherein said first EC line is fully established on said component design as ECc, and when present, any additional EC lines are fully or partially positioned between ECc and said distal EC line, when viewed in plan view, in the drawing direction; and combining said component design, and said addendum design, to design said tool.

19. The non-transitory computer readable medium as claimed in claim 18 additionally comprising specifying a blank outline; specifying the sheet metal material; specifying the thickness of the material; specifying the lubrication properties; specifying retaining devices which devices are selected from a draw bead, or a spacer, and/or by specifying tool movements.

* * * * *